INVENTORS
PIERRE ESSINGER
EVON C. GREANIAS
BY Robert E. Sandt
AGENT

Feb. 7, 1967 P. ESSINGER ET AL 3,303,465

CHARACTER RECOGNITION APPARATUS EMPLOYING A CURVE FOLLOWER

Filed Dec. 30, 1963 16 Sheets-Sheet 2

"3" LOGIC

TEST 002

TEST 019

TEST 004

TEST 017

TEST 021

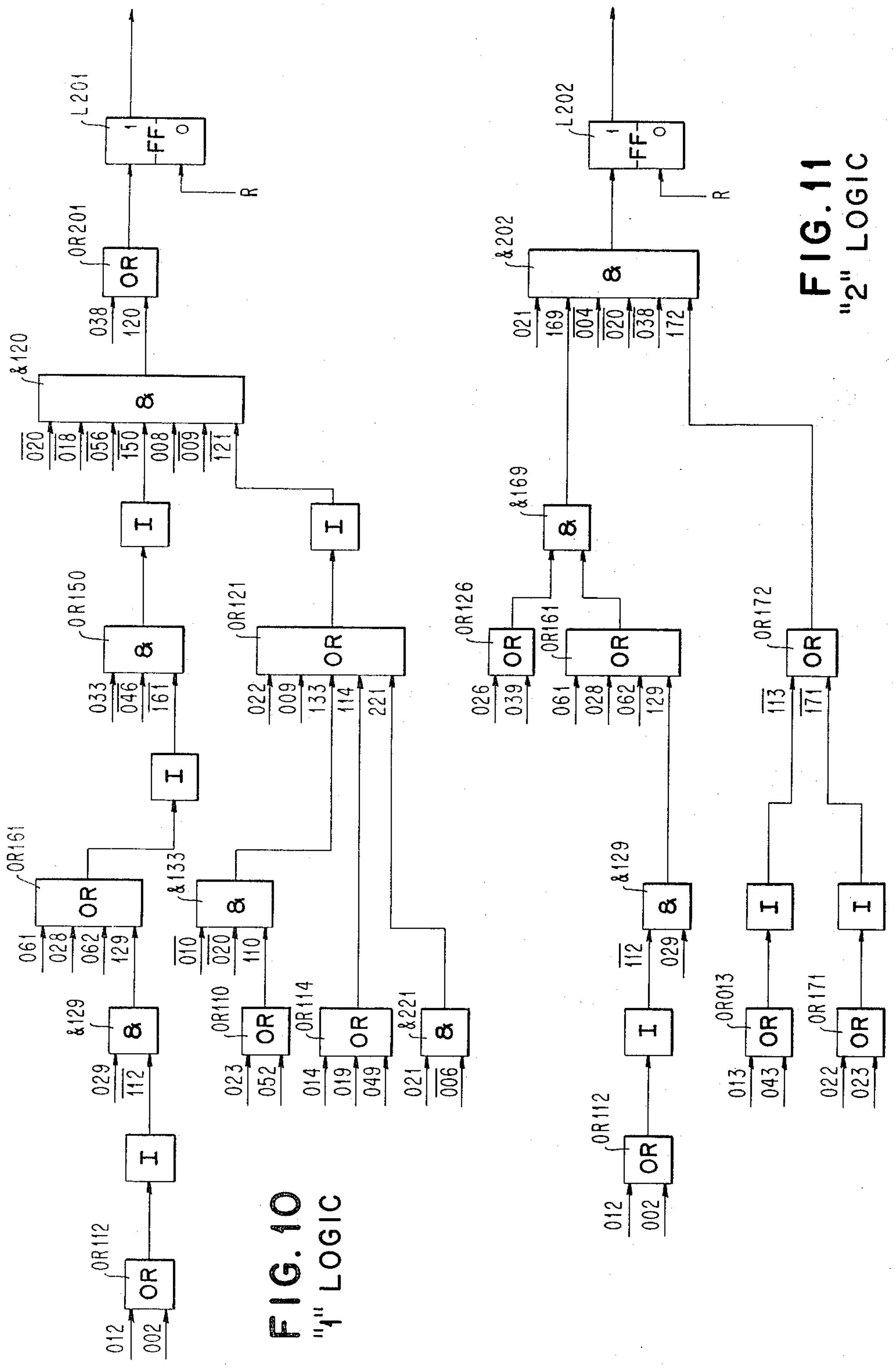
FIG. 10 "1" LOGIC, FIG. 11 "2" LOGIC

CHARACTER RECOGNITION APPARATUS EMPLOYING A CURVE FOLLOWER

Filed Dec. 30, 1963 16 Sheets-Sheet 9

"4" LOGIC

"5" LOGIC

"6" LOGIC

"7" LOGIC

Feb. 7, 1967 P. ESSINGER ETAL 3,303,465

CHARACTER RECOGNITION APPARATUS EMPLOYING A CURVE FOLLOWER

Filed Dec. 30, 1963 16 Sheets-Sheet 11

2ND PASS "8" LOGIC

CHARACTER RECOGNITION APPARATUS EMPLOYING A CURVE FOLLOWER

2ND PASS "9" LOGIC

Feb. 7, 1967 P. ESSINGER ETAL 3,303,465

CHARACTER RECOGNITION APPARATUS EMPLOYING A CURVE FOLLOWER

Filed Dec. 30, 1963 16 Sheets-Sheet 13

2ND PASS "O" LOGIC

TEST 035

TEST 036

Feb. 7, 1967 P. ESSINGER ETAL 3,303,465

CHARACTER RECOGNITION APPARATUS EMPLOYING A CURVE FOLLOWER

Filed Dec. 30, 1963 16 Sheets-Sheet 16

3,303,465
CHARACTER RECOGNITION APPARATUS EMPLOYING A CURVE FOLLOWER

Pierre Essinger, Yorktown Heights, and Evon C. Greanias, Chappaqua, N.Y., assignors to International Business Machines Corporation, New York, N.Y., a corporation of New York Filed Dec. 30, 1963, Ser. No. 334,507
6 Claims. (Cl. 340—146.3)

This invention relates to pattern recognition apparatus, and more particularly to apparatus for following the configuration of an imprinted lexical symbol and producing signals indicative of the identity of the symbol.

While character recognition apparatus employing curve followers as input devices are known in the art, they all operate as analog devices. They achieve their identification by processing the analog voltages representing the trace, to obtain derived waveforms which are then compared with stored waveforms to effect the recognition. In distinction thereto, the present invention employs hybrid computing techniques in that both analog and digital manifestations are processed to achieve the recognition. Any curve follower is necessarily a position responsive servomechanism, and, as such, moves through a path defined by the shape of the curve being followed. The succession of displacements of the servomechanism as a function of time, therefore, represents an analog measure of the configuration of the character or symbol. These analogs in the present invention are time-variant electrical waveforms which are continuously processed in their analog form to produce digital signals representing the successive positions of the follower with respect to a synthetic matrix having a given number of columns and rows upon which the symbol is superimposed to fill the matrix. The waveforms are also processed to yield further digital signals representing the successive headings of the follower in tracing the symbol. These digital signals are logically combined in predetermined combinations and permutations with time persistence as a further condition precedent to the testing for characteristic feature shapes. The results of the feature tests are finally combined in digital logic to effect the recognition. If a given symbol produces a conflict of recognition, the curve follower is caused to effect a special trace designed to resolve the conflict.

In accordance with foregoing principles of operation, it is an object of this invention to provide a character recognition apparatus operating with both analog and digital manifestations in a hybrid computer to produce recognition of the symbol whose identity is sought.

It is a further object of this invention to provide a character recognition apparatus employing a curve following device as an input device.

Another object of this invention is to provide a character recognition apparatus capable of identifying handwritten lexical symbols.

A still further object of this invention is to provide a character recognition apparatus in which a curve follower follows the unknown character outline and produces time variant displacement voltages manifestive of the shape of the trace; the trace voltages are processed to obtain digital velocity heading signals, and digital matrix position signals; the heading signals and the matrix signals combinatorially and permutationally measured with time persistence to test for salient features, and the feature tests logically combined to effect the recognition.

Yet another object of this invention is to provide in a character recognition apparatus employing a curve following apparatus, means for altering the operation of the curve follower in response to the failure of the apparatus to uniquely identify the symbol.

An even further object is to provide a character recognition apparatus having a curve follower operated in successive cycles, in which the first cycle measures the size of the symbol, and the second cycle produces waveforms which are analyzed with respect to the symbol size measured in the first cycle to effect the recognition of the symbol.

The foregoing and other objects, features and advantages of the invention will be apparent from the following more particular description of a preferred embodiment of the invention, as illustrated in the accompanying drawings.

Figure 5:
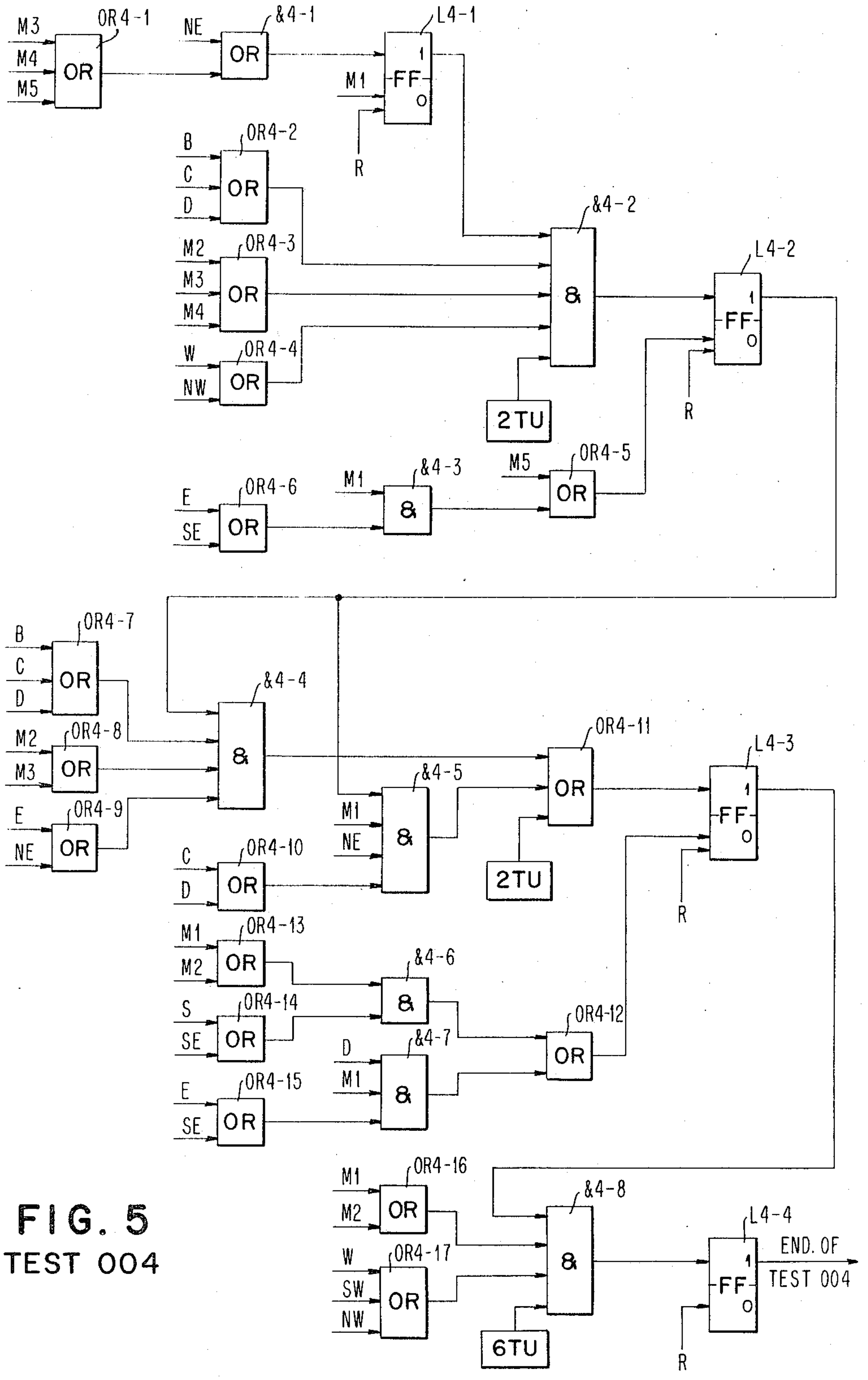
FIG. 5 is a schematic logic block diagram of Test 004.
Figure 5A:
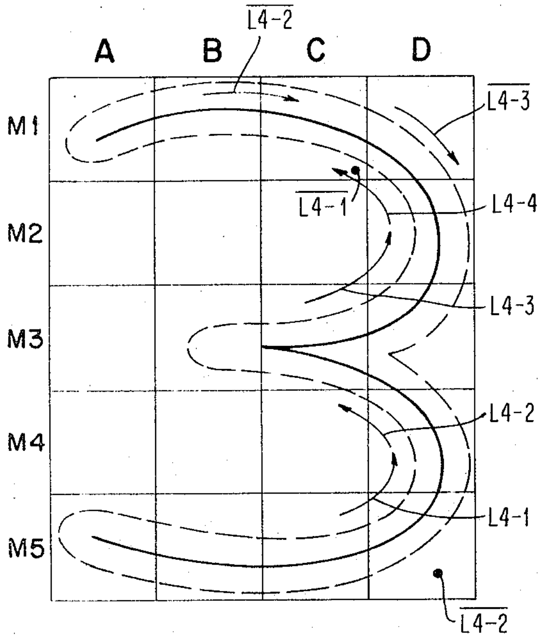

FIG. 5*a* is a trace diagram of Test 004.

Figure 6:
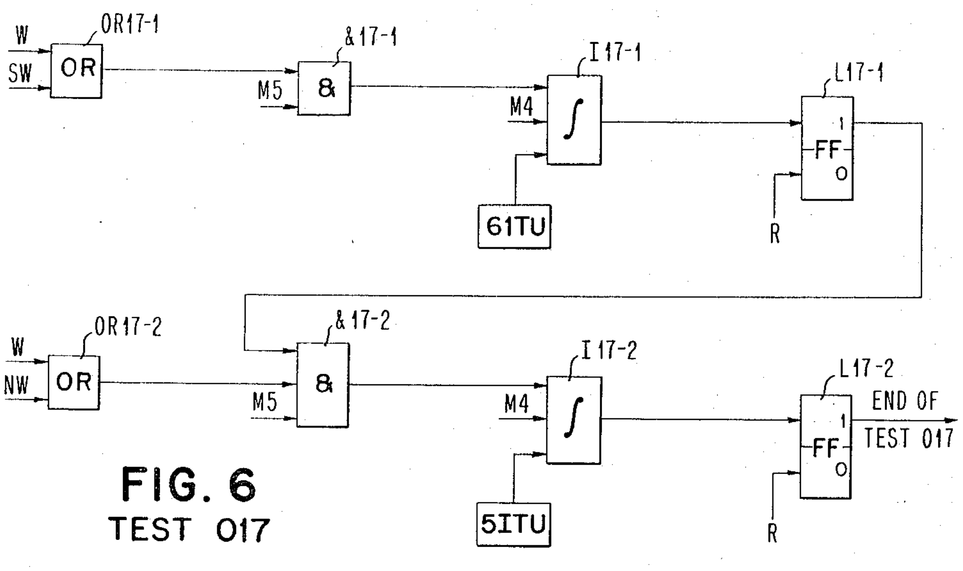

FIG. 6 is a schematic logic block diagram of Test 017.

Figure 6A:
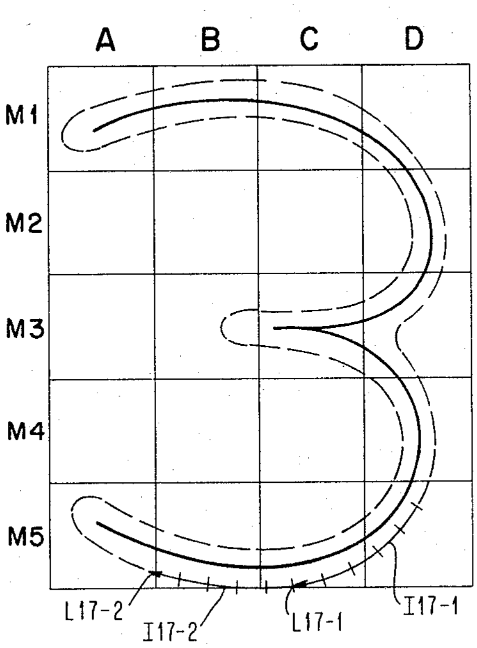

FIG. 6*a* is a trace diagram of Test 017.

Figure 7:
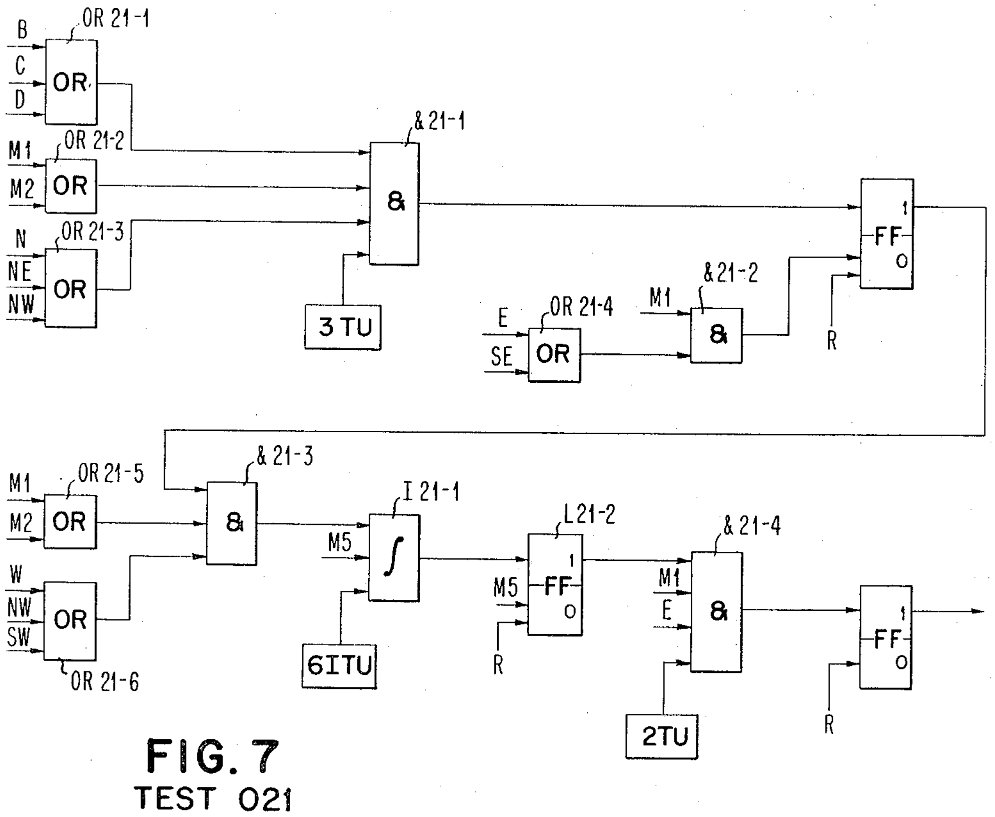

FIG. 7 is a schematic logic block diagram of Test 021.

Figure 7A:
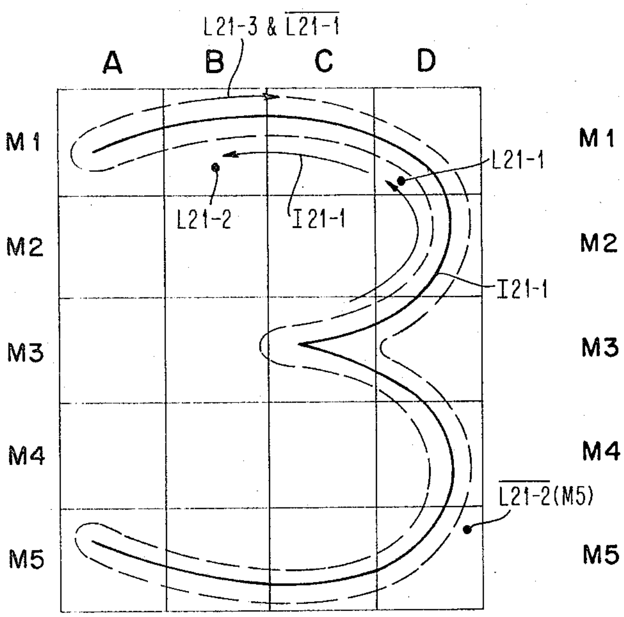

FIG. 7*a* is a trace diagram of Test 021.

Figure 8:
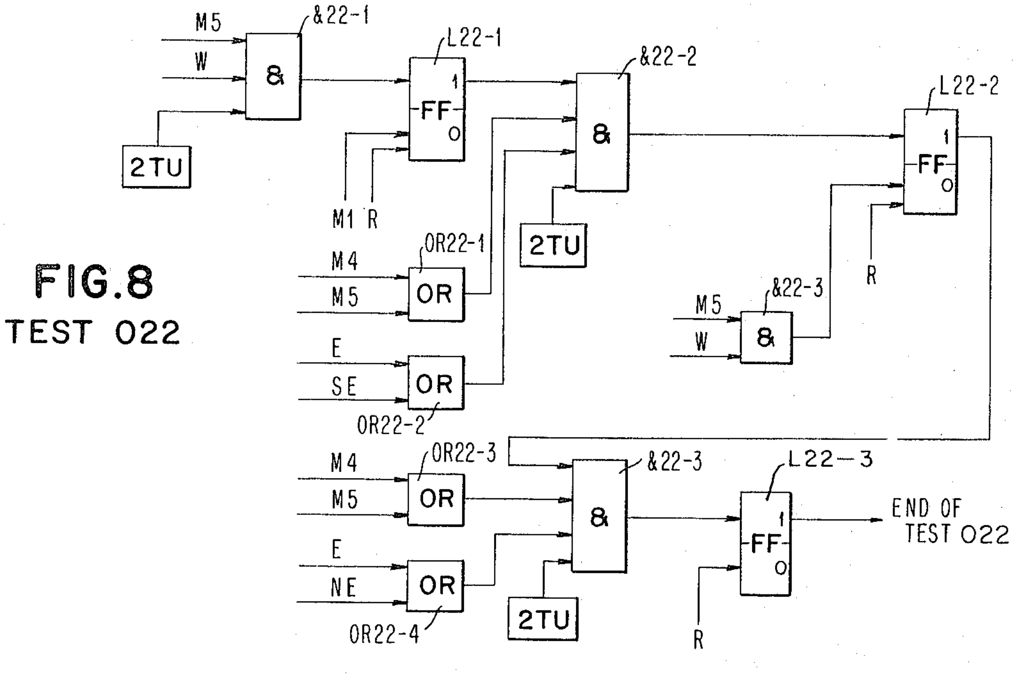

FIG. 8 is a schematic logic block diagram of Test 022.

Figure 8A:
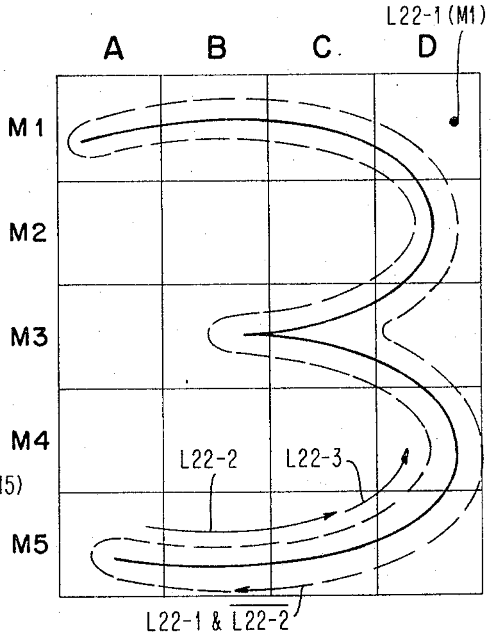

FIG. 8*a* is a trace diagram of Test 022.

Figure 9:
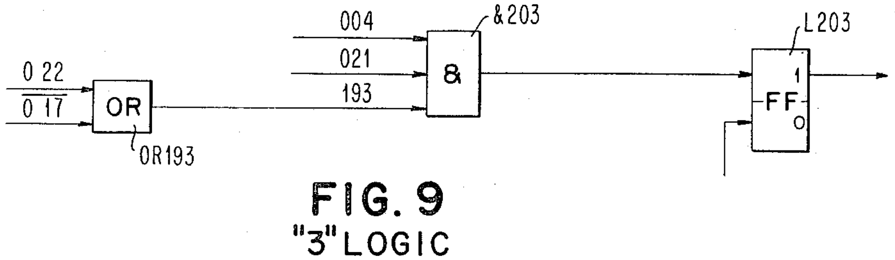

FIG. 9 is a schematic logic block diagram of the recognition logic for the numeral "3."

FIG. 10 is a schematic logic block diagram of the recognition logic for the numeral "1."

FIG. 11 is a schematic logic block diagram of the recognition logic for the numeral "2."

Figure 12:
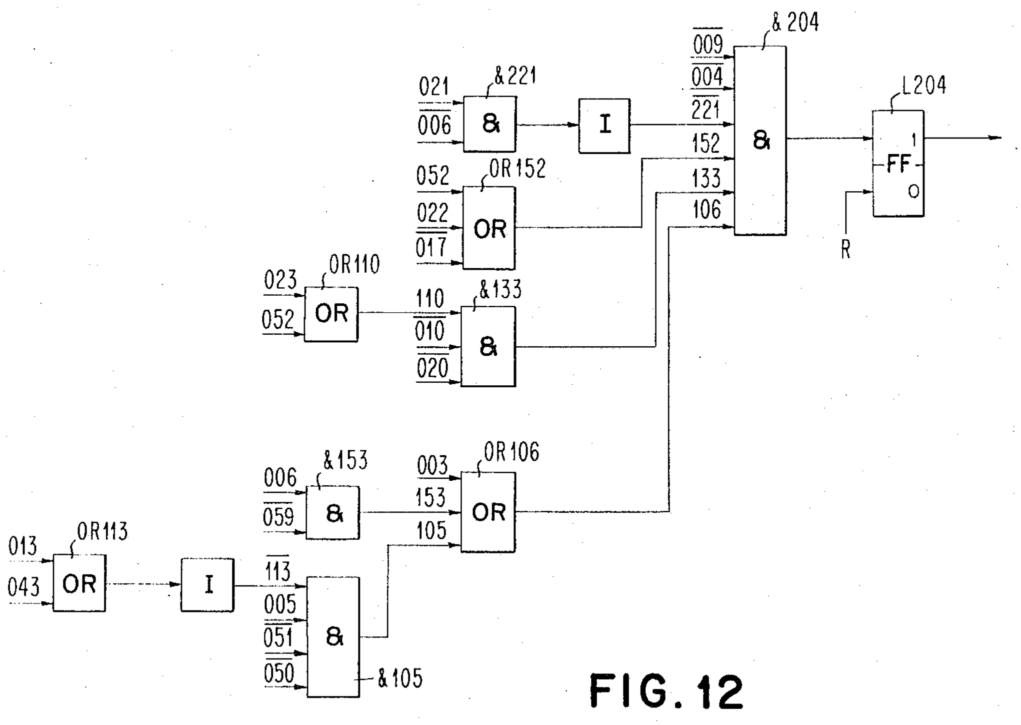

FIG. 12 is a schematic logic block diagram of the recognition logic for the numeral "4."

Figure 13:
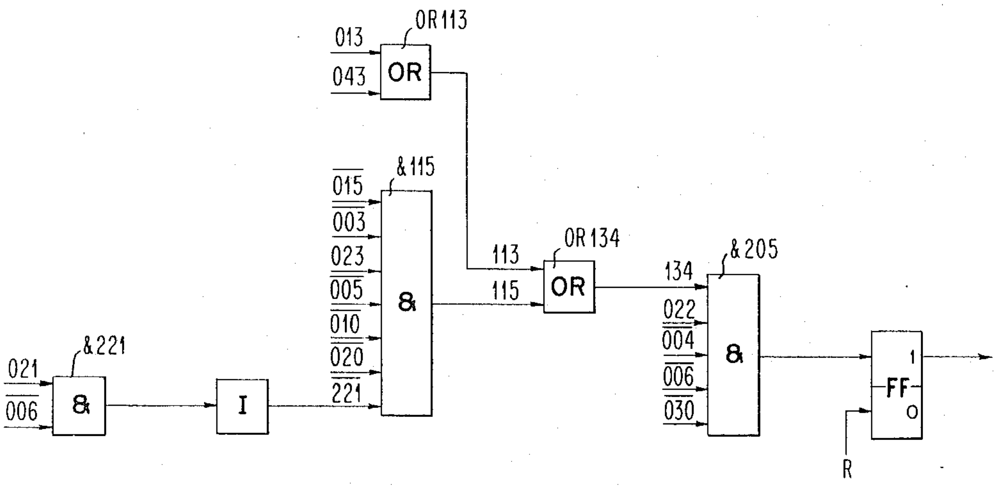

FIG. 13 is a schematic logic block diagram of the recognition logic for the numeral "5."

Figure 14:
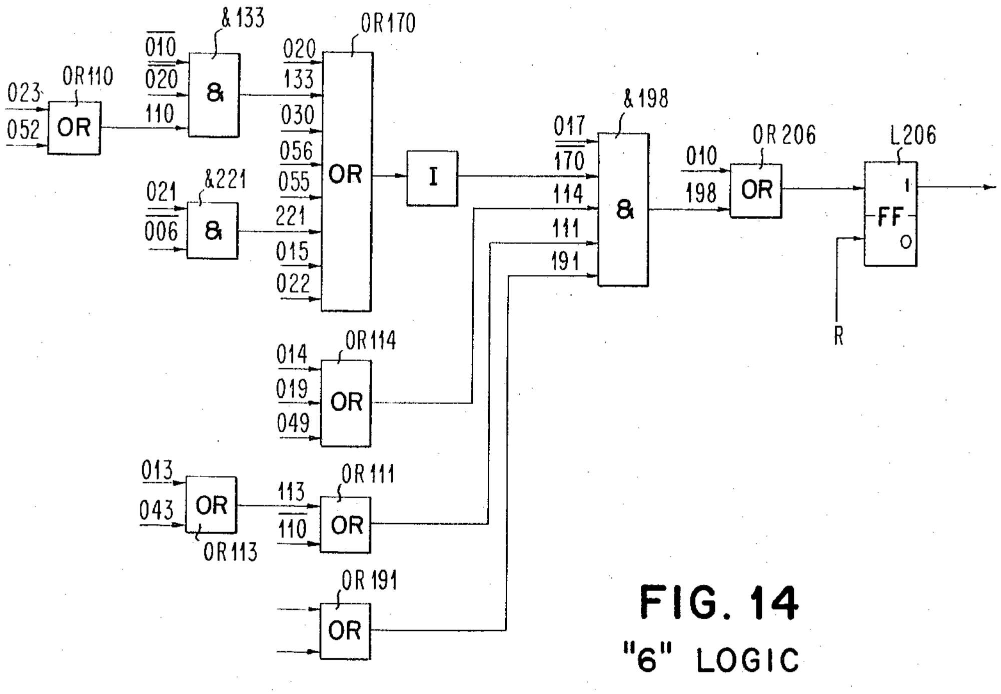

FIG. 14 is a schematic logic block diagram of the recognition logic for the numeral "6."

Figure 15:
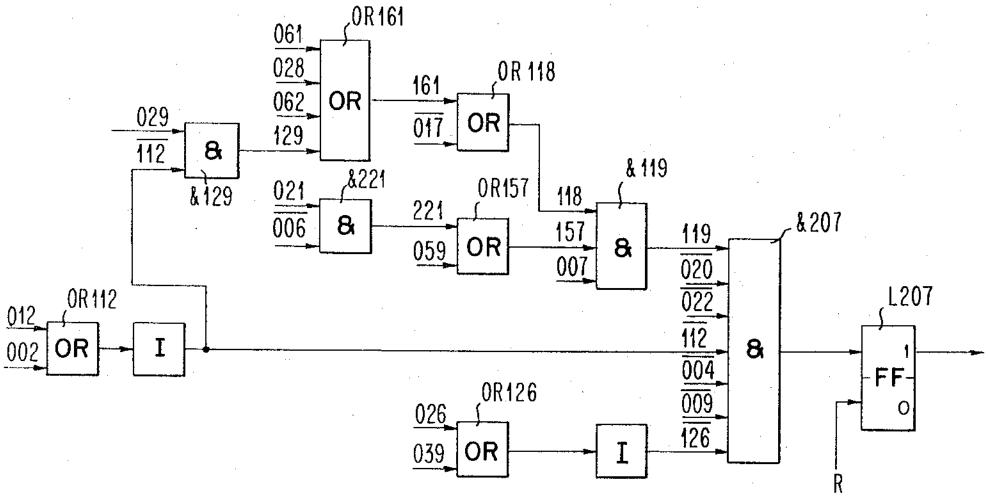

FIG. 15 is a schematic logic block diagram of the recognition logic for the numeral "7."

Figure 16:
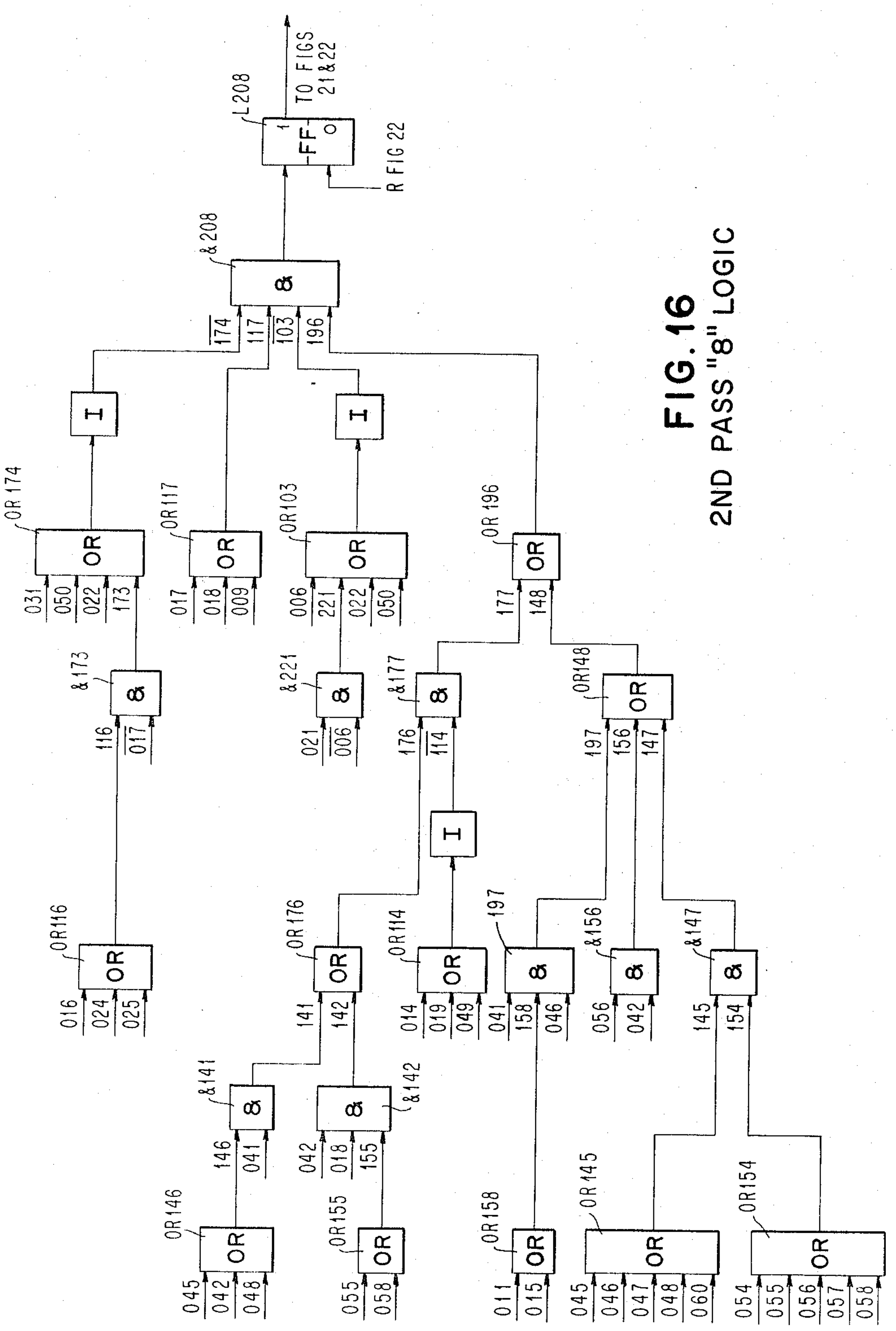

FIG. 16 is a schematic logic block diagram of the recognition logic for the numeral "8."

Figure 17:
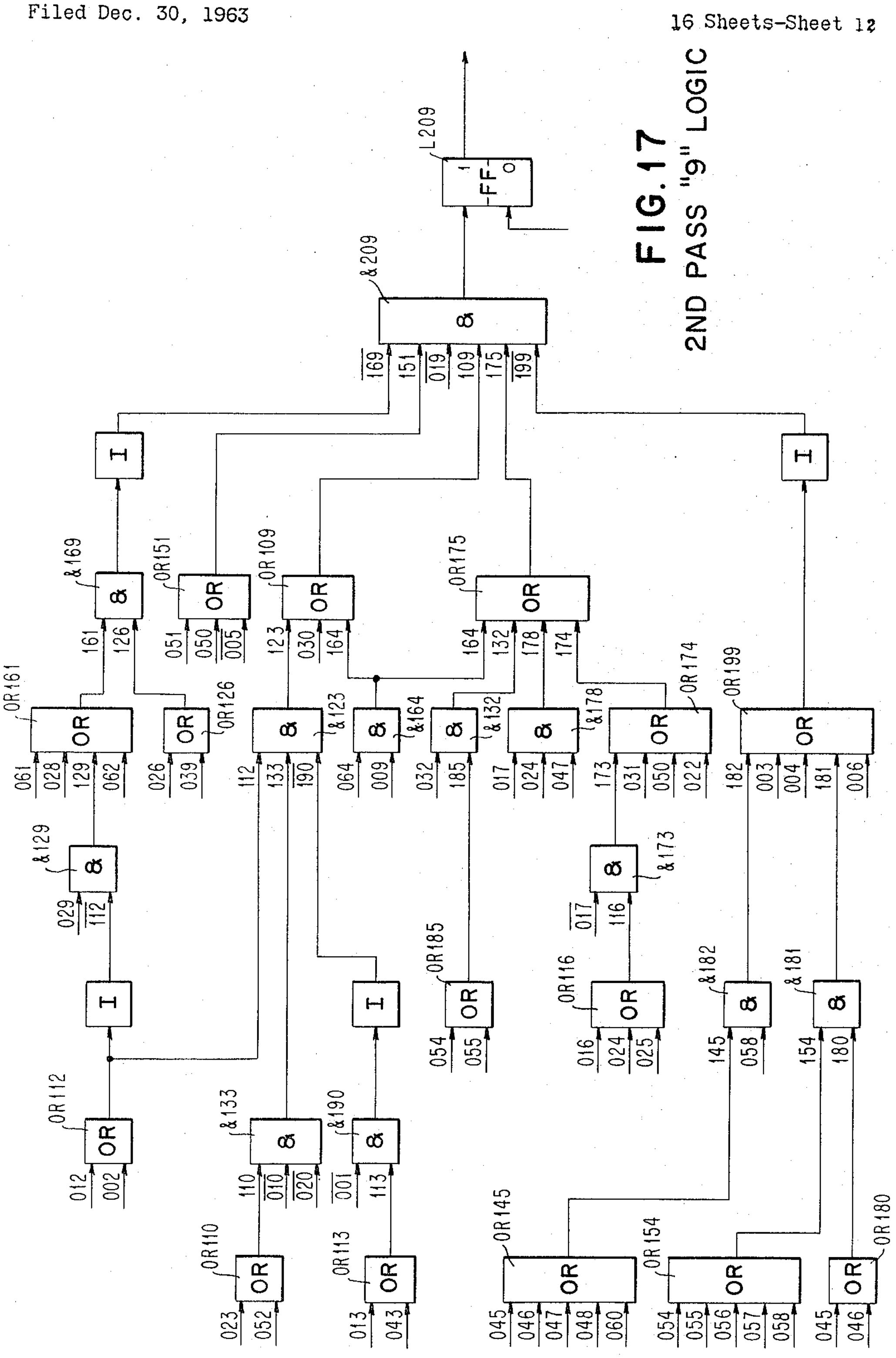

FIG. 17 is a schematic logic block diagram of the recognition logic for the numeral "9."

Figure 18:
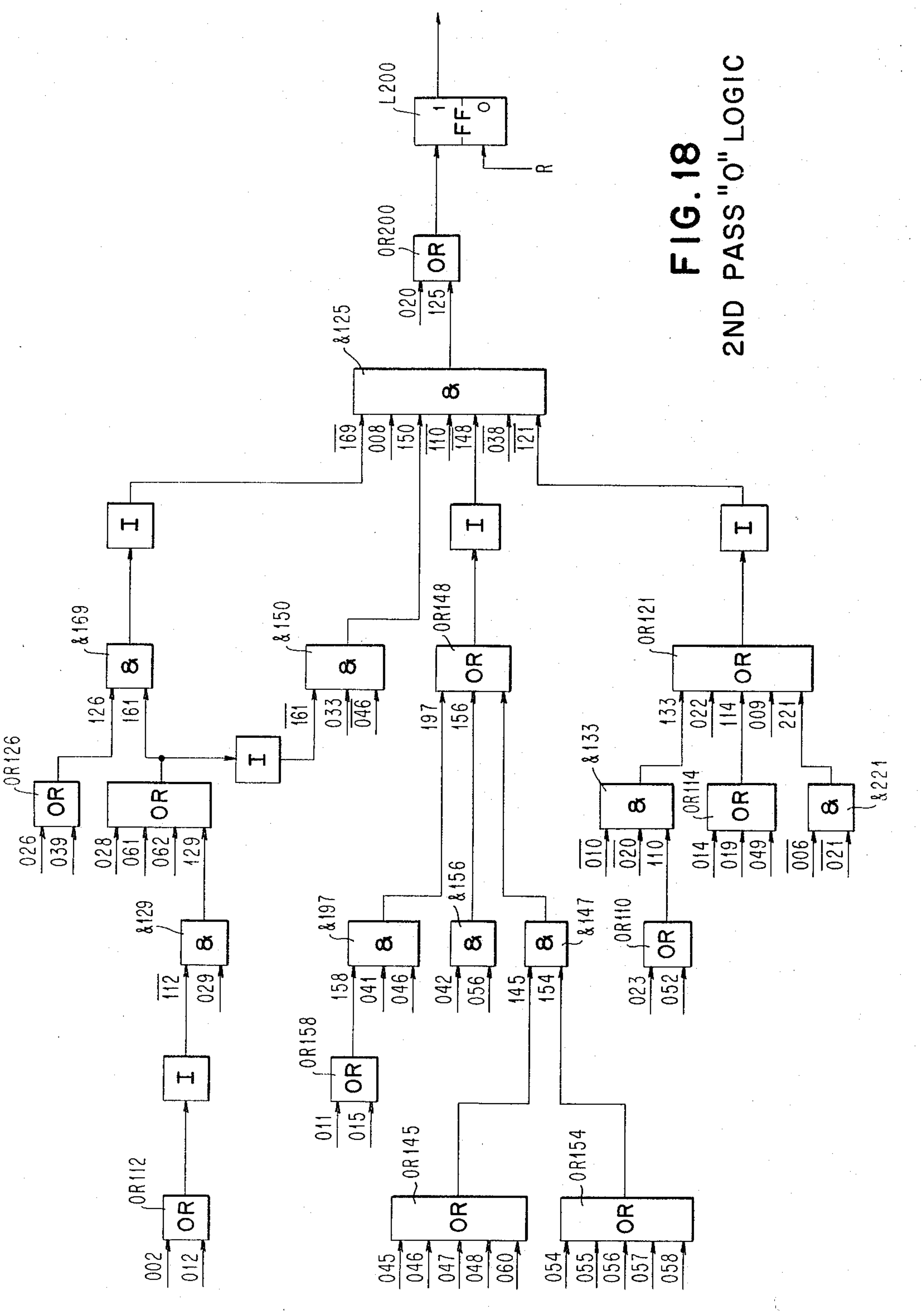

FIG. 18 is a schematic logic block diagram of the recognition logic for the numeral "0."

Figure 19:
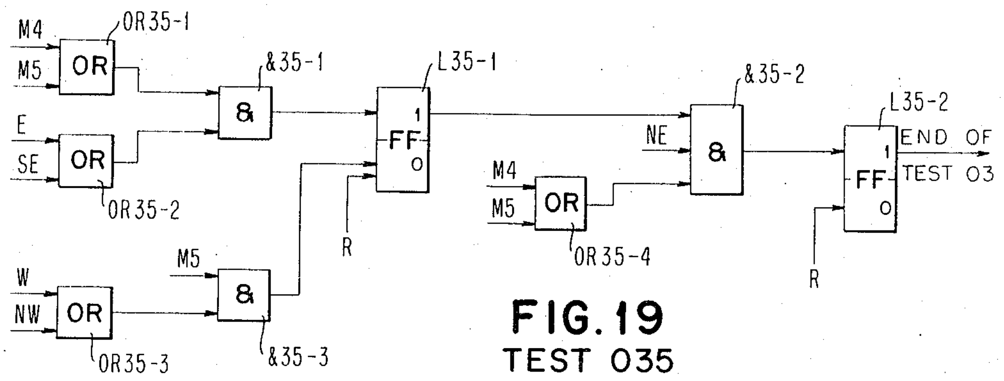

FIG. 19 is a schematic logic block diagram of Test 035.

Figure 19A:
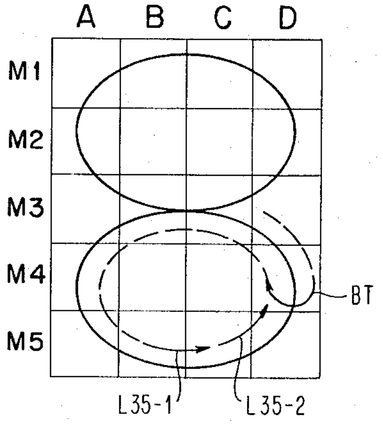

FIG. 19*a* is a trace diagram of Test 035 applied to an "8."

Figure 19B:
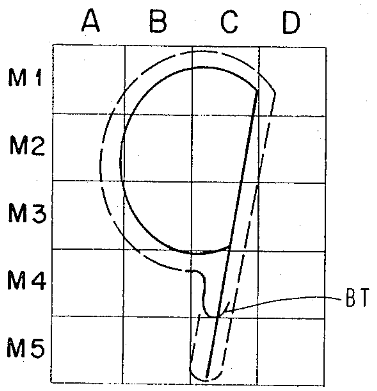

FIG. 19*b* is a trace diagram of Test 035 applied to a straight stem "9."

Figure 19C:
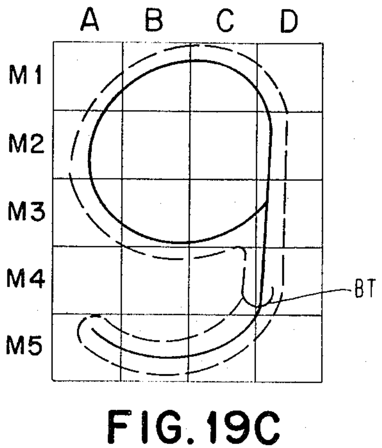

FIG. 19*c* is a trace diagram of Test 035 applied to a curved stem "9."

Figure 20:
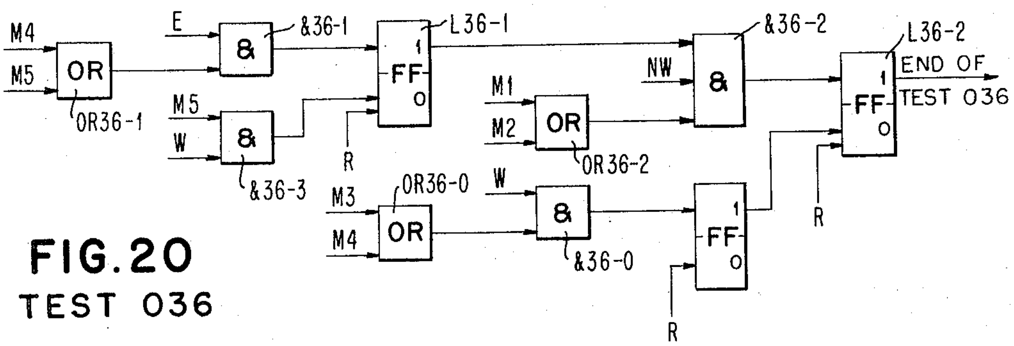

FIG. 20 is a schematic logic block diagram of Test 036.

Figure 20A:
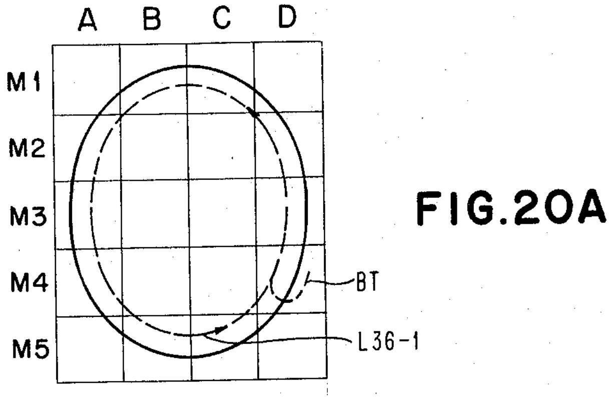

FIG. 20*a* is a trace diagram of Test 036.

Figure 21:
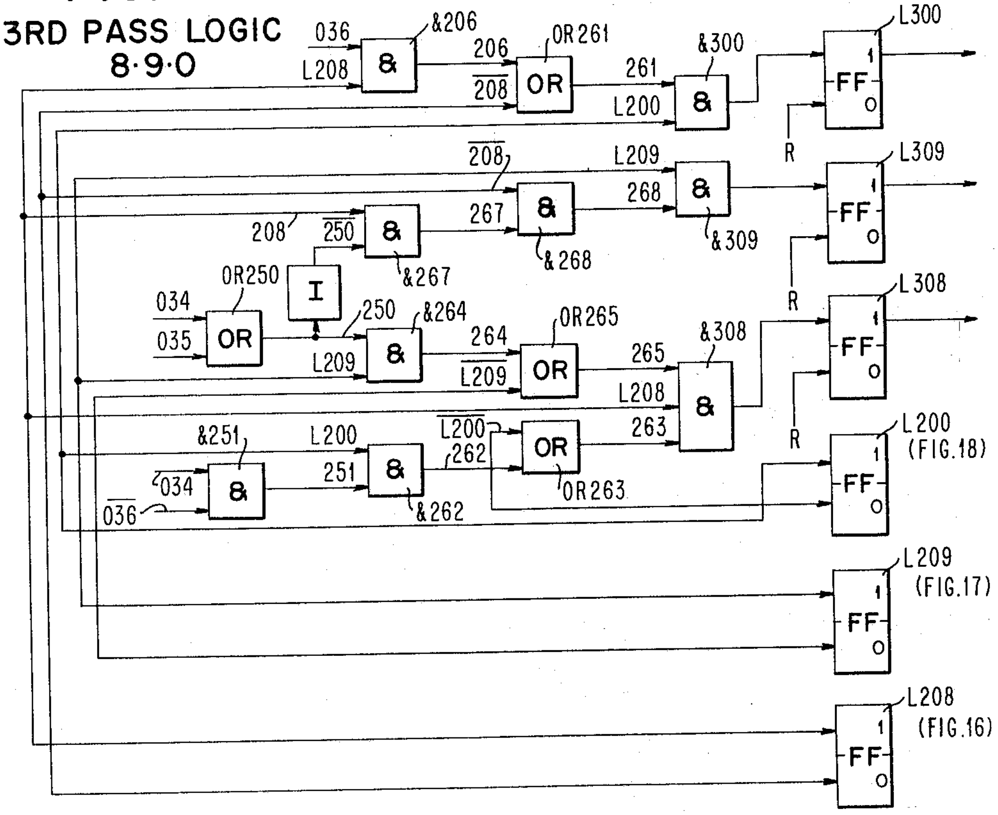

FIG. 21 is a schematic block diagram of the third pass recognition logic.

Figure 22:
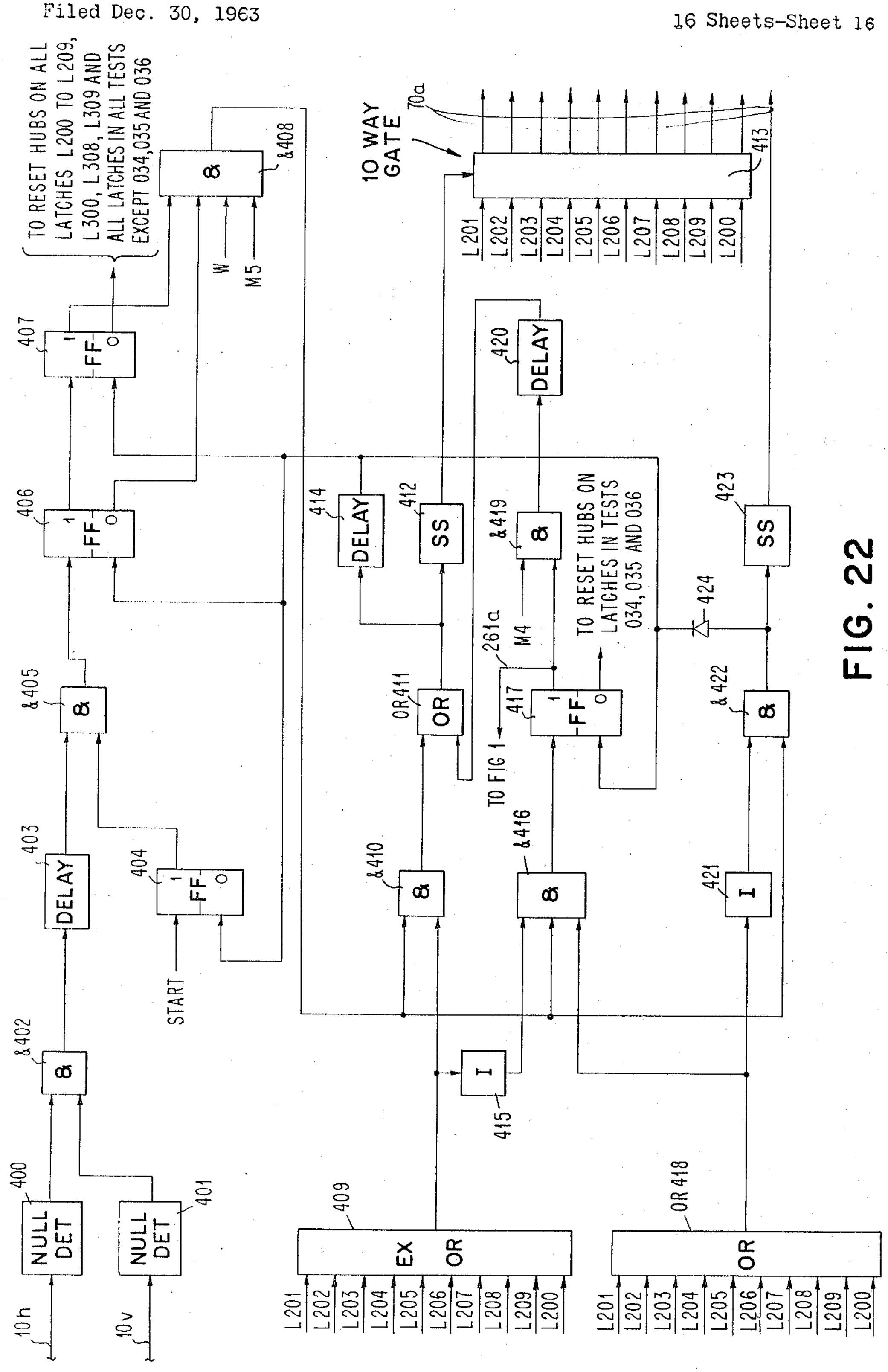

FIG. 22 shows details of the control circuits.

MODE OF OPERATION

The lexical symbol (character) to be identified is scanned in successive cycles of operation by a curve follower type of scanner, rather than by a fixed pattern scanner. By the very nature of the scanner, the trace for each symbol is necessarily unique to that symbol, and reflects at least a derived function of the shape of the symbol. The term "derived function" is employed, because the curve follower follows lines by tracing out a path a fixed distance from the edge of the line, and also follows either the interior or exterior of closed symbols;

but never both in any one cycle of operation. Open symbols are followed on both sides of the line. Thus, the trace of a "1" would consist of two spaced, parallel, substantially vertical lines joined by two semi-circles. The exterior trace of an "8" is a wasp-waisted oval, without any interior detail, such as the horizontal cross-bar which separates the figure 8 into two circles. The curve follower, as it traces the outline of the symbol, produces two time-variant waveforms respectively measuring the successive horizontal and vertical displacements (as a function of time) of the curve follower.

Each symbol is traced at least twice in two complete cycles around it. On the first pass, the maximum and minimum excursions of both the horizontal and vertical waveforms are stored as voltages measuring the gross dimensions of the symbol. During the second and subsequent tracing cycles, these stored voltages are employed to adjust the operation of the apparatus to compensate for differences in the sizes of the symbols.

The time variant waveforms are continuously processed during the second (and subsequent) passes around the character to produce slope signals. Actually, these slope signals represent the successive headings of the instantaneous velocity vectors of the curve follower's trace. Since the curve follower traces both sides of the line of any non-closed symbol, the slope signals must be oriented with respect to the direction of rotation that the follower follows. For clockwise follower action (up on the left, down on the right), a line sloping 45° upward to the right produces a northeast slope to the left of the line and a southwest slope to the right of the line. Each line, therefore, in an open symbol will yield two slope signals. It has been found that eight different slope signals are sufficiently definitive, particularly when handwritten symbols are being processed. These slope signals are binary-like (off or on) and indicate the presence or absence of the successive slopes in eight 45° sectors, representing the eight principal points of the compass rose.

The two time-variant waveforms are further processed during cycles subsequent to the first cycle to produce signals indicative of the successive matrical positions. The stored voltages obtained during the first trace are employed as a frame of reference against which the waveform voltages obtained during the second pass are compared. This comparison partitions the character into 4 vertical and 5 horizontal zones to form the matrix. The matrix signals, 9 in number, are again binary-like in nature. Since any planar position is defined by two coordinates, two of the nine matrix signals are always present. Because of the normalization of the symbols in the 4 x 5 matrix, narrow characters, like the numeral "1," will be expanded in width, so that the two parallel traces on the left and right side of the line will be allocated to the two outside vertical columns of the matrix.

The eight binary-like binary slope signals and the nine binary-like matrix position signals obtained from the analog processing circuits, provide the sole data inputs for recognition purposes. These signals are tested continuously in various logical combinations for their presence or absence for predetermined time durations, as the symbol is scanned, to register the presence or absence of features that have been deemed definitive of the various symbols. Once a feature test is successfully passed, the registration thereof is stored until the end of the cycle. At that time, predetermined ones of the tests are logically combined to identify the particular symbol. Generally speaking, the succession of slopes, without regard to the rate of change of slopes, is not sufficiently definitive of a a feature. For example, a 180° shift in slope cannot be achieved without passing through the intervening slopes. Thus, absent time as a variable, it is not possible to tell whether the transition was substantially instantaneous (as in a line end) or gradual, as in a curved line. If the test is able to detect that the 180° change in slope occurred within less than a predetermined time, then the transition would define a line end. Conversely, if the rate of change of slope were more gradual (with intervening slopes persisting for substantial periods) then the transition tested would define a curve. Matrical areas in which the various transitions occur complete the identification of the sought features, in that features are defined as certain shape forms in predetermined locations.

Since, as will be explained later in greater detail, the curve follower traces a symbol with a velocity dependent upon the size of the character, the transit time within any one matrix position for a given symbol is substantially constant. Thus, for any analysis of a given feature the transit time for the feature is substantially constant. This effect can most easily be appreciated if one considers the numeral 1. If a small symbol 1 is being traced, the gross migrational velocity of a follower apparatus will be slow, and the curve follower will execute the vertical motion from top to bottom in substantially the same time as it would were it following a large symbol of the same configuration. The matrix signals would, therefore, have the same succession and time distribution independent of the size of the character.

SCHEMATIC OPERATION

Figure 1:
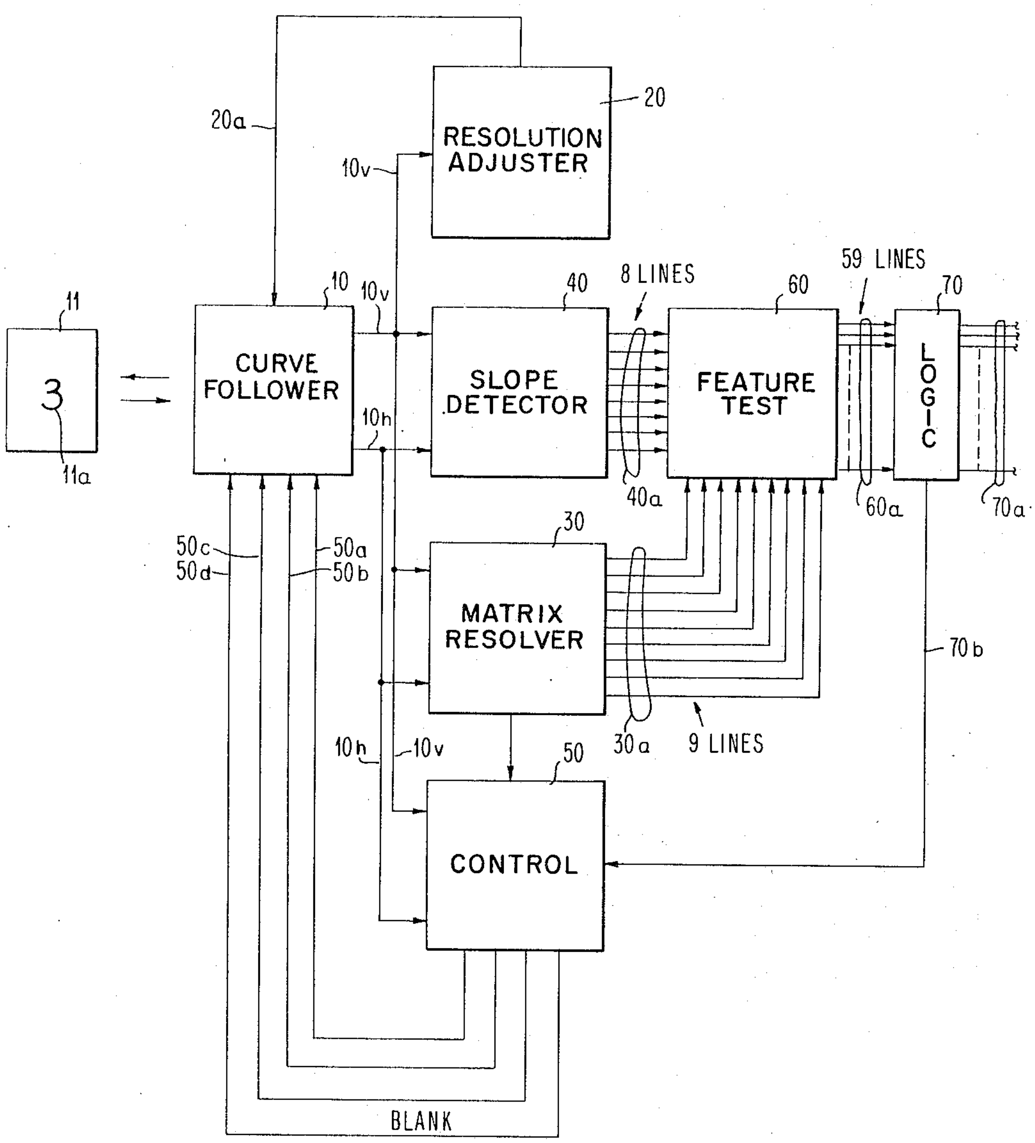
FIG. 1 is a schematic block diagram of the over-all operation of the invention.

The mode of operation hereinabove described is performed by the apparatus shown schematically in FIG. 1. Since certain of the component apparatuses shown in FIG. 1 are the subject of copending patent applications, only such functional description will be given as to enable one to understand the contribution of these components to the over-all operation of the character recognition device. For detailed descriptions of the component apparatuses reference may be made to the following copending applications. The curve follower 10 is fully disclosed and described in the application of Greanias et al. Serial Number 306,119, dated September 3, 1963, now U.S. Patent No. 3,229,100. The resolution adjustment 20 is disclosed in the Greanias et al. application Serial Number 305,254 dated August 29, 1963. The matrix resolver 30 is fully described in the Essinger et al. application Serial Number 305,255 filed August 29, 1963, now U.S. Patent No. 3,248,699. The slope detector 40 is disclosed in the Greanias et al. application Serial Number 305,464, dated August 29, 1963. The control circuits 50 are disclosed in part in the above applications and, when necessary, will be described in greater detail.

Specifically, in FIG. 1, the curve follower 10 images a spot of light from a cathode ray tube within the follower upon the surface of a document 11 containing the symbol 11*a* whose identity is sought to be established. The reflected light from the document background and the character 11*a* controls integrators and other circuits within the follower 10 to move the cathode ray tube beam in a path such that the imaged spot follows the outline of the symbol 11*a*. The deflection voltages which animate the spot are thus manifestive of the shape of the symbol traced. These voltages (filtered of any high frequency components) are delivered on the lines 10*h* and 10*v* as waveforms, respectively measuring the instantaneous orthogonal displacements of the beam (and the imaged spot) at all instances of time during the tracing, or following operation. These waveforms, if applied to a cathode ray tube, would, in fact, reproduce the pattern of the trace, and be visually recognizable as the source symbol. The curve follower, once it has attached itself to a symbol, will follow the outline of that symbol until interrupted by external controls.

The curve follower 10 is normally operated in two tracing cycles. During the first cycle, the symbol is scanned solely to measure its gross size, viz., maximum horizontal and vertical dimensions. On the second trace the time-variant waveforms are processed to identify the symbol. If, at the end of the second trace, the recognition logic detects a conflict (as between an "8" and a "0"), a third pass will be initiated, in which pass the follower will be caused to follow inside of the figure with tests and logic specifically tailored to resolve the conflict.

During the first measuring pass around the symbol, the horizontal and vertical displacement voltages on the lines **10*h* and 10*v* are used to measure the character size. The maximum positive and negative excursions of these voltages are stored (as for example, in capacitors) and the differences of the stored voltages obtained as a measure of the character size. The resolution adjustor 20 receives only the vertical voltage excursions, and thus measures only the maximum vertical dimension of the symbol, this being sufficient for its intended function. Thus, at the end of the first pass, the resolution adjustment circuit 20 has stored therein a voltage indicative of the maximum vertical size of the symbol. This stored voltage is regeneratively fed on line 20*a* back to the curve follower 10 to adjust the speed at which the follower will trace the symbol on the second and subsequent traces. In essence, large symbols have a greater tracing speed than small symbols, the object being to trace around a symbol in a complete cycle in substantially constant time, independent of the size of the symbol. That the length to width ratio varies as between different symbols does not adversely affect the operation, as time with respect to any given symbol is accounted for in the feature test circuits. The purpose of the resolution adjustment circuits 20, for example, is to trace a big "5" and a little "5" in the same time. That it traces a "1" in less time than a "5" of comparable height does not affect the recognition. Because of the nature of the follower 10**, the adjustment of the tracing speed also adjusts the resolution of the trace. Thus, features in a finely drawn symbol that might be missed by a coarse resolution trace will be detected.

Also, during the first tracing cycle of the follower 10, the maximum horizontal and vertical deflection voltages appearing on the lines **10*h* and 10*v* are stored, and their differences obtained in the matrix resolver 30. It is the function of this apparatus to normalize the size of the character symbol by synthetically expanding or contracting it in both dimensions to fill a matrix having 4 vertical columns and 5 horizontal rows. The stored horizontal and vertical difference voltages are applied to the ends of two voltage dividers having five and six taps (including the end taps), to respectively define four and five voltage zones. On the second pass, the instantaneous horizontal and vertical deflection voltages on the lines 10*h* and 10*v* are compared with the respective stored voltages in the various zones, and signals developed indicative of the column and row displacement of the tracing beam. Since the system is orthogonal, one column and one row signal will always be present. The output signals on the lines 30*a* may, therefore, have 20 different combinations representing the 20 matrix positions. A character such as the figure "1" will be non-linearly expanded, such that the width of the trace will be expanded to occupy the two outer columns of the matrix. Because of the resolution adjustment achieved in device 20** to effectively adjust the follower speed to character size, and the synthetic expansion or contraction of the character superimposes it on the 4 x 5 matrix, the transit time for one matrix space is approximately 6 time units, wherein each time unit equals approximately 23 microseconds.

The slope detector 40 receives the horizontal and vertical deflection voltages on the lines **10*h* and 10*v*, differentiates the voltages to obtain voltages indicative of the horizontal and vertical velocity components of the trace. These velocity component voltages are continuously compared and equated to the tangent of 22½°, with cognizance being taken of the respective signs of the voltages, to resolve the resultant vector into 8 headings. These vector headings represent the slope of the symbol as the tracing beam follows the outline thereof. The output of the slope detector is a signal on one of the lines 40*a*** representing the instantaneous slope of the symbol.

Control circuits 50 have been included in the schematic showing, merely for the purpose of indicating the closed loop nature of a complete reading machine. Since only certain portions of these circuits are necessary to the operation of the invention, only those necessary will be treated at length. Remaining portions of the circuit will be alluded to only by their function. Generally speaking, control circuits within the box 50 will provide gross deflection voltages to the cathode ray tube within the follower 10 to position the spot adjacent to the character being followed. The control circuits also operate to detect that a complete circuit of the symbol has been detected, and controls the curve follower 10 to trace inside on a third cycle upon a signal from the recognition logic. All necessary details of the control circuit 50 will be described if the need for such circuit details arises. For the purpose of the understanding of the operation of the invention, it will be assumed that the control circuits 50 have positioned the tracing beam adjacent to the symbol 11*a*, and that the curve follower 10 is operatively following the outline of the symbol to be identified.

From the foregoing functional description of the various components it should be remembered that the first trace around the symbol measures and stores the size of the character. During the second pass around the symbol, the matrix resolver 30 develops successive signals on 2 out of the 9 lines **30*a*, indicating the position of the tracing beam within a synthetic 4 x 5 matrix. During the second pass a slope detector 40 produces successive signals on one of the 8 lines 40*a* indicative of the successive slopes of the symbol. The coordination of slopes and matrix positions are analyzed in the feature test circuits 60. The feature tests continuously analyze the input signals of slope and spatial distribution, together with time persistence, and register the success of each test, as it occurs. At the end of the second trace these test results are logically combined in the logic circuit 70 to produce the recognition signal. There are 59 tests, the results of which are manifested by the presence of signal potentials on one or more of the 59 lines 60*a*. The output from the logic circuit 70, since the apparatus is built to recognize handwritten numerals, is a signal on one only of the 11 lines 70*a*, representing the digits "0"–"9," and a failure of recognition signal. The line 70*b* represents a conflict line, and signals the control circuits 50 to cause the follower 10** to effect a third trace of the character in a so-called "partitioned" scan.

All of the circuits necessary to identify the numerals "0"–"9" will be described in detail. The Boolean algebraic expressions representing the conditions precedent for all of the tests required as inputs to the recognition logic for the ten numerals will be set forth in tabular form. Through the teachings of the construction of the circuits for the chosen examples from the Boolean expressions, it will be apparent to one skilled in the art how to construct the remaining feature test circuits.

FEATURE TESTS

The feature test circuits shown schematically as the box 60 in FIG. 1 process only the on and off signals produced by the slope detector 40 and the matrix resolver 30. The slope signals are delivered as the presence or absence of signals on the eight lines **40*a* representing the instantaneous slopes. Since only one slope may exist at any one instant only one of the lines 40*a* has a signal potential thereon at any one instant. The matrix resolver 30, on the other hand, always produces one column and one row signal on the lines 30*a***, since a two dimensional location must have two coordinates.

The signals processed by the feature test circuits are represented in Boolean algebraic expressions and in the logic block diagrams as follows:

N, NE, E, SE, S, SW, W, NW—represent the eight vector heading signals.

M1, M2, M3, M4, M5—represent the horizontal row signals manifesting the instantaneous position in the normalized 4 x 5 matrix.

A, B, C, D—represent the vertical column signals manifesting the instantaneous position in the normalized 4 x 5 matrix.

The feature tests are performed dynamically as the character is scanned by processing the slope and matrix signals in standard logical devices with built-in delay devices which measure the persistence of the conditions precedent to the success or failure of the test. The delay gates might be characterized as slow acting AND gates with instant reset. Generally speaking, each test employs a series of cascaded latches, each latch having a given set of conditions precedent for its operation including the operation of the preceding latch. Within the chain of latches are circuits for nullifying the effectiveness of any of the latches to energize the next following latch. In other instances, a predetermined set of conditions precedent may nullify the success of a whole test.

Since the tests are too many and detailed to explain each one in detail, the Boolean expressions for all the tests will be set forth in detail, and illustrative ones thereof converted to logical block diagrams.

To facilitate the understanding of the Boolean expressions hereinafter set forth, the conventions set forth in the section following are employed.

BOOLEAN CONVENTIONS EMPLOYED (a) A plus sign between terms or parenthetic expressions signifies the logical OR function.

(b) Parentheses or brackets enclosing a term or expression signify the logical AND function.

(c) Parentheses and brackets are employed conventionally to include the expressions or terms therein in the indicated function.

(d) A bar over a symbol, term, or expression signifies the logical NOT function.

(e) $L$=signifies the conditions precedent to establish a latch in its set condition.

(f) $\overline{L}$=signifies the conditions precedent to establish a latch in its "not set" or reset condition.

(g) L as a term in a Boolean expression signifies that the latch in its set condition will satisfy the stated logic condition.

(h) TU preceded by a number indicates a number of time units corresponding to the prefixed digital value This when ANDed with other terms signifies that the phenomena represented by the logical statement of terms must persist uninterruptedly for the requisite number of time units. Time units are invariably associated with the setting or resetting of a latch.

(i) I=signifies the conditions precedent to accumulate time in an integrator. Every integrator achieves a given threshold sufficient to operate a latch after a number of time units specific to each integrator.

(j) ITU preceded by a number signifies the requisite number of integrated time units that the conditions precedent must persist (though intermittently present) to raise an integrator to its threshold.

(k) $\overline{I}$=signifies the conditions precedent necessary to reduce the integrated value in an integrator to zero. The reset of a latch associated with any given integrator also resets the integrator.

(1) L6–4 signifies the fourth latch in the sixth test, the number next to the L signifying the test number, and the dashed number signifying the latch within the test.

EXAMPLES (a) $I6\text{–}2=[[(M1+M2)(A+B)(NE)]+[(M2+M3)(A)(N)]](3ITU)$ means that the second integrator of Test 006 will achieve its threshold value if 3 integrated time units of M1 or M2, and A or B, and NE are accumulated, or 3 integrated time units of M2 or M3, and A, and N are accumulated.

(b) $L6\text{–}4=I6\text{–}2$ means that the fourth latch of Test 006 will be set when integrator 2 achieves its threshold value.

(c) $\overline{I6\text{–}2}=M5$ means that the second integrator of Test 006 will reset (lose its accumulation) upon the scan attaining the fifth row in the matrix.

(d) $L6\text{–}5=(L6\text{–}4)(A+B)(M2+M3)(S+SW)(2TU)$ means that latch 5 will set if latch 4 remains set for 2 continuous time units together with A or B, and M2 or M3, and S or SW.

(e) $\overline{L6\text{–}5}=L6\text{–}0$ means that the fifth latch will be reset if the zero latch is set. Generally, the zero latch is an absolute nullity condition that destroys the final latch and prevents it from being set.

BOOLEAN EXPRESSIONS FOR THE TESTS

The Boolean expressions for the various feature tests employed in the recognition of handwritten numerals follow. These tests are identified by a number from 1 through 64 preceded by a zero, and by a title roughly descriptive of the feature tested. Some of the test numbers in the series are not used.

Test 01—Inside trap detection:

$L1\text{–}1=E$
$\overline{L1\text{–}1}=W$
$L1\text{–}2=(L1)(N)$
$\overline{L1\text{–}2}=S$
$L1\text{–}3=(L2)(W)$
$\overline{L1\text{–}3}=E$
$L1\text{–}4=(L3)(S)$
$\overline{L1\text{–}4}=N$
$L1\text{–}5=(L4)(E)$
$\overline{L1\text{–}5}=W$
$L1\text{–}6=(L5)(N)$ $L1\text{–}6$=End of test.

Test 02—Top of "9" vs. top of "2" or "7":

$L2\text{–}1=(A+B)(M1+M2+M3+M4)(NW)(2TU)$
$L2\text{–}2=(L2\text{–}1)(A+B)(M1+M2+M3+M4)(N+NW)(3TU)$
$\overline{L2\text{–}2}=M5+[(C+D)(M1+M2)(NE)]$
$L2\text{–}3=(L2\text{–}2)(A+B)(M1+M2+M3)(N+NE)(3TU)$
$L2\text{–}4=(L2\text{–}3)(A+B)(M1+M2+M3)(NE)(2TU)$
$L2\text{–}5=(L2\text{–}4)(D)(M2)(S+SW)$
$L2\text{–}0=[(A+B)(M1)(W+S+SW)]+[(A)(M2)(S+SW)]$
$\overline{L2\text{–}5}=L2\text{–}0$ $L2\text{–}5$=End of test.

Test 03—Tail on right of "4":

$L3\text{–}1=(C+D)(M3+M4+M5)(W)$
$\overline{L3\text{–}1}=M2$
$L3\text{–}2=(L3\text{–}1)(M5)(S+SW)(3TU)$
$L3\text{–}3=(L3\text{–}2)(C+D)(M1+M2+M3)(S+SW)(3TU)$
$\overline{L3\text{–}3}=(M1+M2)(W+NW)$
$L3\text{–}4=(L3\text{–}3)(C+D)(M2+M3+M4)(E)$ $L3\text{–}4$=End of test.

Test 04—Cusp of "3":

$L4\text{–}1=(M3+M4+M5)(NE)$
$\overline{L4\text{–}1}=M1$
$L4\text{–}2=(L4\text{–}1)(B+C+D)(M2+M3+M4)(W+NW)(2TU)$
$\overline{L4\text{–}2}=M5+[(M1)(E+SE)]$
$L4\text{–}3=[[(L4\text{–}2)(B+C+D)(M2+M3)(E+NE)]+[(LA\text{–}2)(C+D)(M1)(NE)]](2TU)$
$\overline{L4\text{–}3}=[(M1+M2)(S+SE)]+[(D)(M1)(E+SE)]$
$L\text{–}4=(L4\text{–}3)(M1+M2)(W+SW+NW)(6TU)$ $L4\text{–}4$=End of test.

Test 05—Top of Closed "4":

$L5\text{–}0=(A+B+C)(M1)(W+NW)(4TU)$ $I5\text{–}1=[[(A+B)(M1+M2+M3+M4)(NE)]+[(C+D)(M1+M2)(NE)]](15ITU)$ $\overline{I5\text{–}1}=[[(A+B)(M1+M2+M3+M4)(N+NW+E+SE)]+[(C+D)(M1+M2)(N+NW+E+SE)]](2ITU)$ $L5\text{–}1=I5\text{–}1$ $L5\text{–}2=(L5\text{–}1)(D)(M2)(S+SE+SW)$ $\overline{L5\text{–}2}=L5\text{–}0$ $L5\text{–}2$=End of test.

Test 06—Top of open "4":

$L6\text{–}1=(A+B)(M1+M2)(N+NE)$ $\overline{L6\text{–}1}=(M1+M2)(W+NW)(3TU)$ $L6\text{–}2=[[(L6\text{–}1)(A+B+C)(M1+M2+M3)(S+SW)]+[(L6\text{–}1)(A+B+C)(M2+M3)(SE)]](3TU)$ $\overline{L6\text{–}2}=[M1+M2)(W+NW)(3TU)]+M5$ $L6\text{–}3=(L6\text{–}2)(B+C)(M2+M3+M4)(E)$ $\overline{L6\text{–}3}=M5$ $L6\text{–}4=(L6\text{–}3)(B+C+D)(M1+M2+M3)(N+NE)(3TU)$ $L6\text{–}4$=End of test.

Test 07—Positive test for "7":

$L7\text{–}1=(A+B)(1)$ $\overline{L7\text{–}1}=[[(M3)(E+SE)]+[(C+D)(M3)(W+NW)]](2TU)$ $L7\text{–}1$=End of test.

Test 08—Positive test for "0" & "1":

$L8\text{–}1=(M5)(W+SW+NW)$ $L8\text{–}2=(L8\text{–}1)(A)(N+NE+NW)$ $L8\text{–}3=(L8\text{–}2)(M1)(E+NE+SE)$ $L8\text{–}3$=End of test.

Test 09—Open loop on "9" or "8" (top loop):

$L9\text{–}1=(M1+M2)(W+NW)(3TU)$ $\overline{L9\text{–}1}=[(M1)(E+SE)]+M5$ $L9\text{–}2=(L9\text{–}1)(A+B)(M1+M2+M3)(S)$ $\overline{L9\text{–}2}=M5+[(M1)(E+SE)]$ $L9\text{–}3=(L9\text{–}2)(A+B+C)(M2+M3)(E)$ $\overline{L9\text{–}3}=(M2+M3+M4)(SE)$ $L9\text{–}4=(L9\text{–}3)(M2+M3+M4)(S)$ $L9\text{–}4$=End of test.

Test 010—Open loop in "6":

$L10\text{–}1=(M1)(E)$ $\overline{L10\text{–}1}=M5$ $L10\text{–}2=(L10\text{–}1)(A+B)(M4+M5)(S+SW)$ $\overline{L10\text{–}2}=M1+[(M5)(W)]$ $L10\text{–}3=(L10\text{–}2)(M4+M5)(E)$ $\overline{L10\text{–}3}=(M4+M5)(S+SE+SW)$ $L10\text{–}4=(L10\text{–}3)(B+C)(M3+M4)(W+NW)$ $L10\text{–}4$=End of test.

Test 011—Persistently curved top principally of "8" vs. "6":

$I11\text{–}1=[[(M1)(E+SE)]+[(D)(M1)(S)]](8ITU)$ $\overline{I11\text{–}1}=M3$ $L11\text{–}1=I11\text{–}1$ $L11\text{–}1$=End of test.

Test 012—Top of "9" vs. top of "7":

$L12\text{–}1=(A+B+C)(M2+M3)(W)(4TU)$ $\overline{L12\text{–}1}=(A+B)(M1+M2)(SW)$ $L12\text{–}2=[[(L12\text{–}1)(A+B)(M1)(NE)]+[(L12\text{–}1)(A)(M2)(NE)]](6TU)$ $L12\text{–}2$=End of test.

Test 013—Long top of "5":

$I13\text{–}1=(M1)(E+SE+NE)(8ITU)$ $\overline{I13\text{–}1}=M3$ $\overline{L13\text{–}1}=I13\text{–}1$ $\overline{L13\text{–}1}=M3$ $L13\text{–}2=(L13\text{–}1)(C+D)(M1)(S+SE+E)$ $\overline{L13\text{–}2}=M3$ $I13\text{–}2=[[(L13\text{–}2)(M1+M2)(W+NW)]+[(L13\text{–}2)(M1)(SW)]+[(L13\text{–}2)(A+B)(M2)(SW)]](8ITU)$ $\overline{I13\text{–}2}=(A+B)(M1)(E+NE)$ $L13\text{–}3=I13\text{–}2$ $\overline{L13\text{–}3}=(A+B)(M1)(E+NE)$ $L13\text{–}3$=End of test.

Test 014—Bay of "6":

$L14\text{–}1=(A+B+C)(M2+M3)(S+SE)$ $\overline{L14\text{–}1}=(M5)(W+NW)$ $L14\text{–}2=[[(L14\text{–}1)(B+C+D)(M2+M3+M4)(E)]+[(L14\text{–}1)(B+C+D)(M4+M5)(NE)]](3TU)$ $\overline{L14\text{–}2}=(C+D)(M2+M3)(W+SW)(3TU)$ $L14\text{–}3=(L14\text{–}2)(C+D)(M4)(S+SE+SW)(2TU)$ $L14\text{–}3$=End of test.

Test 015—Complete curved top as in "8":

$L15\text{–}1=(A+B)(M1)(N+NE)$ $L15\text{–}2=(L15\text{–}1)(D)(M2)(S+SE+SW)(4TU)$ $\overline{L15\text{–}2}=M1$ $L15\text{–}2$=End of test.

Test 016—Straight stem on "9":

$I16\text{–}1=(M4+M5)(N)(4ITU)$ $\overline{I16\text{–}1}=M1$ $L16\text{–}1=I16\text{–}1$ $\overline{L16\text{–}1}=(M1)(E+SE)$ $L16\text{–}2=(L16\text{–}1)(M2+M3+M4)(S+SW)(2TU)$ $L16\text{–}2$=End of test.

Test 017—Rounded bottom of "6" or "8" vs. sharp line end:

$I17\text{–}1=(M5)(W+SW)(6ITU)$ $\overline{I17\text{–}1}=M4$ $L17\text{–}1=I17\text{–}1$ $I17\text{–}2=(L17\text{–}1)(M5)(W+NW)(5ITU)$ $\overline{I17\text{–}2}=(M4)$ $L17\text{–}2=I17\text{–}2$ $L17\text{–}2$=End of test.

Test 018—Rounded top of "8" vs. sharp discontinuity:

$I18\text{–}1=(M1)(E+NE)(5ITU)$ $\overline{I18\text{–}1}=M2$ $L18\text{–}1=I18\text{–}1$ $I18\text{–}2=(L18\text{–}1)(M1)(E+SE)(5ITU)$ $\overline{I18\text{–}2}=M2$ $L18\text{–}2=I18\text{–}2$ $L18\text{–}2$=End of test.

Test 019—Loop of closed "6":

$L19\text{–}1=(C+D)(M4+M5)(S)(2TU)$ $L19\text{–}2=(L19\text{–}1)(B+C+D)(M5)(W+S+W)(6TU)$ $L19\text{–}3=(L19\text{–}2)(M1)(E+SE)$ $L19\text{–}4=[(L19\text{–}3)(B+C)(M3)(E+SE)]+[(L19\text{–}3)(C+D)(M2)(E)]$ $\overline{L19\text{–}4}=[(D)(M2+M3+M4)(W)]+[(C+D)(M2)(SW)]$ $I19\text{–}1=(L19\text{–}4)(B+C+D)(M3+M4)(E+SE)(4ITU)$ $\overline{I19\text{–}1}=[(D)(M2+M3+M4)(W)]+[(C+D)(M2)(SW)]$ $L19\text{–}5=I19\text{–}1$ $\overline{L19\text{–}5}=[(D)(M2+M3+M4)(W)]+[(C+D)(M2)(SW)]$ $L19\text{–}5$=End of test.

Test 020—Open "0":

$L20\text{-}0=[(C+D)(M5)(N)]+[(B+C)(M4)(W)]$ $L20\text{-}1=(A+B)(M2)(S+SW)$ $\overline{L20\text{-}1}=M1+[(M5)(W)]$ $I20\text{-}1=(L20\text{-}1)(M4+M5)(E+NE+SE)(8ITU)$ $L20\text{-}2=I20\text{-}1$ $\overline{L20\text{-}2}=[(M1)(E+NE)]+[(M5)(W)]$ $L20\text{-}3=[(L20\text{-}2)(C+D)(M1)(N+NW)]+[L20\text{-}2)(D)(M2)(N)]$ $\overline{L20\text{-}3}=L20\text{-}0$ $L20\text{-}3=$End of test.

Test 021—Top of "2," "3," "7":

$L21\text{-}1=(B+C+D)(M1+M2)(N+NE+NW)(3TU)$ $\overline{L21\text{-}1}=(M1)(SE+E)$ $I21\text{-}1=(L21\text{-}1)(M1+M2)(W+NW+SW)(6ITU)$ $\overline{I21\text{-}1}=M5$ $L21\text{-}1=I21\text{-}1$ $\overline{L21\text{-}2}=M5$ $L21\text{-}3=(L21\text{-}2)(M1)(E)$ $L21\text{-}3=$End of test.

Test 022—Bottom curved tail of "3," "5," "9":

$L22\text{-}1=(M5)(W)(2TU)$ $\overline{L22\text{-}1}=M1$ $L22\text{-}2=(L22\text{-}1)(M4+M5)(E+SE)(2TU)$ $\overline{L22\text{-}2}=(M5)(W)$ $L22\text{-}3=(L22\text{-}2)(M4+M5)(E+NE)(2TU)$ $L22\text{-}3=$End of test.

Test 023—Underbelly of "4," "9," vs. "0," "1":

$I23\text{-}1=[[(M4+M5)(N+NE)]+[(D)(M4+M5)(NW)]](4ITU)$ $\overline{I23\text{-}1}=[(C+D)(M4)(S+SE)]+[(M1)(S+SE)]$ $L23\text{-}1=I23\text{-}1$ $\overline{L23\text{-}1}=[(C+D)(M4)(S+SE)]+[(M1)(S+SE)]$ $L23\text{-}2=(L23\text{-}1)(M2+M3+M4)(W+SW+NW)(4TU)$ $L23\text{-}2=$End of test.

Test 024—Right tilted "9" stem:

$I24\text{-}1=(M3+M4+M5)(NE)(5ITU)$ $I24\text{-}1=M1$ $L24\text{-}1=I24\text{-}1$ $\overline{L24\text{-}1}=M1$ $L24\text{-}2=(L24\text{-}1)(M2+M3+M4)(W+SW)(2TU)$ $L24\text{-}2=$End of test.

Test 025—Stem of "9" having slope oscillating between north and northeast:

$I25\text{-}1=(M3+M4+M5)(N+NE)(8ITU)$ $\overline{I25\text{-}1}=[(M3+M4+M5)(NE)(4TU)]+[M3+M4+M5)(NE)(5TU)]+M1$ $L25\text{-}1=I25\text{-}1$ $\overline{L25\text{-}1}=M1$ $L25\text{-}2=(L25\text{-}1)(M2+M3+M4)(W+SW)(2TU)$ $L25\text{-}2=$End of test.

Test 026—Bottom of "2" vs. "7":

$I26\text{-}1=[[(M5)(W+NW)]+[(A+B)(M3+M4)(E)]+[(C+D)(M4+M5)(E+SE)]](12ITU)$ $\overline{I26\text{-}1}=M1$ $L26\text{-}1=I26\text{-}1$ $L26\text{-}1=$End of test.

Test 027—No Test.

Test 028—Tail of "2" with first interception on the tail:

$L28\text{-}1=(B+C+D)(M3)(S+SW)$ $\overline{L28\text{-}1}=(M5)(W+NW)$ $L28\text{-}2=(L28\text{-}1)(C+D)(M4+M5)(E+NE+SE)(3TU)$ $L28\text{-}2=$End of test.

Test 029—Loop at bottom of "2":

$L29\text{-}1=(M5)(W)$ $\overline{L29\text{-}1}=[(M2+M3)(W)]+M1$ $L29\text{-}2=(L29\text{-}1)(M2+M3)(E)$ $L29\text{-}2=$End of test.

Test 030—Open "9" vs. "5":

$L30\text{-}1=(M1+M2)(W+NW)(3TU)$ $\overline{L30\text{-}1}=[(M1)(E+SE)]+M5$ $L30\text{-}2=(L30\text{-}1)(A+B)(M1+M2+M3)(S)$ $\overline{L30\text{-}2}=M5+[(M1)(E+SE)]$ $L30\text{-}3=(L30\text{-}2)(A+B+C)(M2+M3)(E)$ $\overline{L30\text{-}3}=M5$ $L30\text{-}4=(L30\text{-}3)(C+D)(M2+M3)(NE)$ $\overline{L30\text{-}4}=[(M2+M3+M4)(SE)(3TU)]+[(C+D)(M2+M3+M4)(E)(5ITU)]$ $L30\text{-}5=(L30\text{-}4)(M4+M5)(S+SW)$ $L30\text{-}5=$End of test.

Test 031—Stemmed bottom of "9" in position M5–A of matrix:

$L31\text{-}1=(C+D)(M2+M3)(SW)$ $\overline{L31\text{-}1}=(B+C)(M3+M4+M5)(S)(4TU)$ $L31\text{-}2=(L31\text{-}1)(A)(M5)(SW)$ $\overline{L31\text{-}2}=(A)(M5)(W+NW+N)(6TU)$ $L31\text{-}3=(L31\text{-}2)(A)(M5)(NE)$ $L31\text{-}4=(L31\text{-}3)(A+B)(M3+M4)(W+NW)$ $L31\text{-}4=$End of test.

Test 032—Line end bottom:

$L32\text{-}1=$Master Reset Pulse (SET)

$\overline{L32\text{-}1}=(M5)(W+NW+SW)(5TU)$ $L32\text{-}1=$End of test.

Test 033—Round bottom:

$I33\text{-}1=(M5)(W)(12ITU)$ $\overline{I33\text{-}1}=M1$ $L33\text{-}1=I33\text{-}1$ $I33\text{-}2=[[(L33\text{-}1)(B+C+D)(M5)(SW)]+[(A+B)(M5)(NW)(L33\text{-}1)]](12ITU)$ $L33\text{-}2=I33\text{-}2$ $L33\text{-}2=$End of test.

Test 034—Inside trap (counterclockwise rotation):

$L34\text{-}1=E$ $\overline{L34\text{-}1}=W$ $L34\text{-}2=(L34\text{-}1)(N)$ $\overline{L34\text{-}2}=S$ $L34\text{-}3=(L34\text{-}2)(W)$ $\overline{L34\text{-}3}=E$ $L34\text{-}4=(L34\text{-}3)(S)$ $\overline{L34\text{-}4}=N$ $L34\text{-}5=(L34\text{-}4)(E)$ $\overline{L34\text{-}5}=W$ $L34\text{-}6=(L34\text{-}5)(N)$ $L34\text{-}6=$End of test.

Test 035—Counterclockwise rotation on inside bottom of closed loop (third pass):

$L35\text{-}1=(M4+M5)(E+SE)$ $\overline{L35\text{-}1}=(M5)(W+NW)$ $L35\text{-}2=(L35\text{-}1)(M4+M5)(NE)$ $L35\text{-}2=$End of test.

Test 036—Inside of "0" (third pass):

$L36\text{-}0=(M3+M4)(W)$ $L36\text{-}1=(M4+M5)(E)$ $\overline{L36\text{-}1}=(M5)(W)$ $L36\text{-}2=(L36\text{-}1)(M1+M2)(NW)$ $L36\text{-}2=L36\text{-}0$ $L36\text{-}2=$End of test.

Test 037—Persistent flat top:

$I37{-}1=(M1)(E)(15ITU)$ $\overline{I37{-}1}=M2$ $L37{-}1=I37{-}1$ $L37{-}1=$End of test.

Test 038—Pedestal "1":

$L38{-}0=[[(B+C)(M1)(SW)]+[(A+B)(M4)(NE)]+[(C)(M5)(NW+SW)]](3TU)$ $I38{-}1=(M5)(W)(8ITU)$ $\overline{I38{-}1}=M4$ $L38{-}1=I38{-}1$ $I38{-}2=(L38{-}1)(B+C)(M2+M3+M4)(N)(8ITU)$ $\overline{I38{-}2}=A+[(B+C+D)(M1)(E+NW)(3TU)]$ $L38{-}2=I38{-}2$ $\overline{L38{-}2}=(B+C+D)(M1)(E+NW)(3TU)$ $I38{-}3=(L38{-}2)(B+C)(M2+M3+M4)(S)(8ITU)$ $\overline{I38{-}3}=(C)(M2+M3+M4+M5)(E+SE+NE)$ $L38{-}3=I38{-}3$ $\overline{L38{-}3}=L38{-}0$ $L38{-}3=$End of test.

Test 039—Accountants "2":

$L39{-}1=(B+C+D)(M3+M4+M5)(SW)$ $L39{-}2=(L39{-}1)(A+B+C)(M1)(E+SE+NE)$ $I39{-}1=(L39{-}2)(C+D)(M3+M4+M5)(NE)(6ITU)$ $\overline{I39{-}1}=(M3)(S+SE+SW)$ $L39{-}3=I39{-}1$ $L39{-}3=$End of test.

Test 040—No test.

Test 041—Straight left-side of "6," "0" or "8":

$L41{-}1=(C+D)(M4+M5)(S)$ $I41{-}1=(L41{-}1)(A)(N)(12ITU)$ $\overline{I41{-}1}=(M1)(E+SE)$ $L41{-}2=I41{-}1$ $L41{-}2=$End of test.

Test 042—Straight right side of "0" or "8":

$L42{-}1=(A+B)(M4+M5)(N)$ $I42{-}1=(L42{-}1)(D)(S)(12ITU)$ $\overline{I42{-}1}=(M5)(W+NW)$ $L42{-}2=I42{-}1$ $L42{-}2=$End of test.

Test 043—Straight top of "5" or "6":

$L43{-}1=(C+D)(M1)(S+SE+SW)$ $\overline{L43{-}1}=M3$ $L43{-}2=(L43{-}1)(C+D)(M1+M2)(W+NW)(3TU)$ $\overline{L43{-}2}=[(M5)]+[(M1)(E+SE)]$ $L43{-}3=(L43{-}2)(C)(M2+M3+M4)(E+SE)$ $L43{-}3=$End of test.

Test 044—No test.

Test 045—Right notch of "8" left tilt:

$L45{-}1=(D)(M4+M5)(S)$ $L45{-}2=(L45{-}1)(M1)(E)$ $\overline{L45{-}2}=(A+B)(M1+M2)(W)$ $I45{-}1=L45{-}2)(B+C+D)(M2+M3+M4)(S)(5ITU)$ $\overline{I45{-}1}=[(B+C+D)(M2+M3+M4)(SW)(3ITU)]+M5$ $L45{-}3=I45{-}1$ $\overline{L45{-}3}=M5$ $L45{-}4=(L45{-}3)(D)(M3+M4)(SE)(2TU)$ $L45{-}4=$End of test.

Test 046—Right notch of "8" no tilt:

$L46{-}1=(C+D)(M2+M3+M4)(SW)(2TU)$ $\overline{L46{-}1}=M5+A+[(B+C+D)(M3+M4)(NE)]+[(B+C+D)(M2+M3+M4)(S)(6TU)]$ $L46{-}2=(L46{-}1)(C+D)(M3+M4+M5)(SE)(2TU)$ $L46{-}2=$End of test:

Test 047—Right notch of "8" with right tilt (first test):

$I47{-}1=[[(B+C+D)(M2+M3+M4)(SW)]+[(C+D)(M3)(W)]](6ITU)$ $\overline{I47{-}1}=M5$ $L47{-}1=I47{-}1$ $\overline{L47{-}1}=M5$ $L47{-}2=(L47{-}1)(B+C)(M2+M3+M4)(S)(2TU)$ $\overline{L47{-}2}=[(C+D)(M3+M4)(E+NE)]+[(M5)(W+NW)]$ $L47{-}3=(L47{-}2)(M4+M5)(SW)(2TU)$ $L47{-}3=$End of test.

Test 048—Right notch of "8" with right tilt (second test):

$L48{-}1=(C+D)(M2+M3+M4)(SW)(2TU)$ $\overline{L48{-}1}=[(B+C)(M2+M3)(E)]+[(B)(M2+M3+M4)(W+SW+NW)]+M5$ $L48{-}2=(L48{-}1)(C+D)(M3+M4+M5)(S+SE)(4TU)$ $L48{-}3=(L48{-}2)(D)(M1+M2+M3)(S)(2TU)$ $L48{-}3=$End of test.

Test 049—Stem of "6" in $M1{-}D$:

$L49{-}1=(D)(1)(NE)$ $\overline{L49{-}1}=(D)(1)(E+SE+S)(6TU)$ $I49{-}1=(L49{-}1)(C+D)(M1+M2)(SW)(6ITU)$ $\overline{L49{-}1}=M5$ $L49{-}2=I49{-}1$ $\overline{L49{-}2}=M5$ $L49{-}3=(L49{-}2)(C+D)(M2+M3)(E+SE)(2TU)$ $L49{-}3=$End of test.

Test 050—Underside of closed loop on pendulous "9":

$L50{-}1=(B+C)(M2+M3+M4)(SW)(2TU)$ $\overline{L50{-}1}=M1+M5$ $L50{-}2=(L50{-}1)(A+B+C)(M2+M3+M4)(W)(2TU)$ $\overline{L50{-}2}=M5$ $L50{-}3=(L50{-}2)(A+B)(M2+M3+M4)(NW)(3TU)$ $L50{-}3=$End of test.

Test 051—Top of pointed "9":

$L51{-}1=(A+B)(M5)(W+NW)$ $I51{-}1=(A+B+C)(M2+M3+M4)(W)(10ITU)$ $\overline{L51{-}1}=I51{-}1$ $I51{-}2=(L51{-}1)(A+B)(M2+M3+M4)(N+NW)(4ITU)$ $\overline{I51{-}2}=M1$ $L51{-}2=I51{-}2$ $I51{-}3=(L51{-}2)(D)(M1+M2)(SE)(3ITU)$ $\overline{I51{-}3}=M3$ $L51{-}3=I51{-}3$ $L51{-}3=$End of test.

Test 052—"4" or "9" with minimal length stem:

$L52{-}1=(M5)(N+NE)(2TU)$ $\overline{L52{-}1}=M3+[(M4+M5)(S)]$ $L52{-}2=(L52{-}1)(A+B+C)(M5)(W)(4TU)$ $L52{-}2=$End of test.

Test 053—No test.

Test 054—Left notch of "8" left tilt (first test):

$L54\text{–}1=(B+C)(M4+M5)(NW)(2TU)$
$\overline{L54\text{–}1}=(B+C)(M2+M3+M4)(NE)$
$L54\text{–}2=(L54\text{–}1)(B+C)(M3+M4)(NE)(2TU)$
$\overline{L54\text{–}2}=(B+C)(M2+M3+M4)(NE)$
$I54\text{–}1=(L54\text{–}2)(A+B)(M1+M2+M3+M4)(NW)(6ITU)$
$\overline{I54\text{–}1}=(M1)(E+SE)$
$L54\text{–}3=I54\text{–}1$ $L54\text{–}3$=End of test.

Test 055—Left notch of "8" left tilt (second test):

$I55\text{–}1=(A+B)(M3+M4+M5)(N)(5ITU)$
$\overline{I55\text{–}1}=[[(M1)(E+SE)]+[(A+B)(M3+M4+M5)(NE)]](2TU)+[(C)(M2+M3+M4)(E+NE+SE)]$
$L55\text{–}1=I55\text{–}1$
$\overline{L55\text{–}1}=(C)(M2+M3+M4)(E+NE+SE)$
$L55\text{–}2=(L55\text{–}1)(A)(M2+M3+M4)(NW)(2TU)$
$L55\text{–}3=(L55\text{–}2)(A)(M1+M2+M3)(N)(2TU)$ $L55\text{–}3$=End of test.

Test 056—Left notch of "8" no tilt:

$L56\text{–}1=(A+B+C)(M3+M4)(NE)(2TU)$
$\overline{L56\text{–}1}=M1+[(D)(E+NE+SE)]+M5$
$L56\text{–}2=(L56\text{–}1)(A+B+C)(M2+M3)(NW)(2TU)$ $L56\text{–}2$=End of test.

Test 057—Left notch of "8" right tilt (first test):

$I57\text{–}1=(A+B)(M2+M3+M4+M5)(NE)(6ITU)$
$\overline{I57\text{–}1}=M1+[(C)(M3+M4)]+[(M1)(E+SE)]+[(A+B)(M2+M3)(W)]$
$L57\text{–}1=I57\text{–}1$
$\overline{L57\text{–}1}=[(M1)(E+SE)]+[(A+B)(M2+M3)(W)]$
$L57\text{–}2=(L57\text{–}1)(B+C)(M1+M2+M3)(N)(2TU)$
$\overline{L57\text{–}2}=(A+B)(M2+M3)(W)$
$I57\text{–}2=(L57\text{–}2)(B+C+D)(M1+M2)(NE)(4ITU)$
$\overline{I57\text{–}2}=(M1)(E+SE)$
$L57\text{–}3=I57\text{–}2$ $L57\text{–}3$=End of test.

Test 058—Left notch of "8" right tilt (second test):

$L58\text{–}1=(A)(M4+M5)(N)(2TU)$
$\overline{L58\text{–}1}=(A+B)(M2+M3)(W)$
$L58\text{–}2=(L58\text{–}1)(A+B)(M2+M3+M4)(NE)(2TU)$
$\overline{L58\text{–}2}=M1+[(A+B)(M2+M3)(W)]$
$I58\text{–}1=(A+B)(M1+M2+M3)(N+NW)(4ITU)$
$\overline{I58\text{–}1}=(M1)(E+SE)$
$L58\text{–}3=I58\text{–}1$ $L58\text{–}3$=End of test.

Test 059—Hanging tail on top left of "7":

$L59\text{–}1=(B+C+D)(M1+M2)(W+NW)$
$\overline{L59\text{–}1}=(M1)(E+SE)$
$L59\text{–}2=(L59\text{–}1)(A)(M1+M2)(SW)(6TU)$
$\overline{L59\text{–}2}=M5$
$L59\text{–}3=(L59\text{–}2)(A)(M1+M2)(NE)$ $L59\text{–}3$=End of test.

Test 060—Right notch of "8" measured by translation of south vector from column D to column C to column D:

$L60\text{–}1=(D)(M2+M3)(S)(2TU)$
$\overline{L60\text{–}1}=M5$
$L60\text{–}2=(L60\text{–}1)(C)(M3+M4)(S)(2TU)$
$\overline{L60\text{–}2}=M5$
$L60\text{–}3=(L60\text{–}2)(D)(M4+M5)(S)(2TU)$ $L60\text{–}3$=End of test.

Test 061—Tail of "2" with follow start on tail:

$L61\text{–}1=(C+D)(M4+M5)(E+NE+SE)(2TU)$
$\overline{L61\text{–}1}=M3$
$L61\text{–}2=(L61\text{–}1)(M5)(W)$ $L61\text{–}2$=End of test.

Test 062—Re-entrant curve on underside of tail of "2":

$L62\text{–}1=(M4+M5)(NW)(3TU)$
$\overline{L62\text{–}1}=M1+(C+D)(M4+M5)(SE)$
$L62\text{–}2=(L62\text{–}1)(M5)(SW)(3TU)$ $L62\text{–}2$=End of test.

Test 063—No test.

Test 064—"9" with opening in underbelly:

$L64\text{–}1=(B+C+D)(M3)(N+NE)$
$\overline{L64\text{–}1}=(M1)(E+NE)$
$L64\text{–}2=[(L64\text{–}1)(M1+M2)(W)(3TU)]+[(L64\text{–}1)(M1)(NW)(3TU)]$
$\overline{L64\text{–}2}=(M1)(E+NE)$
$L64\text{–}3=(L64\text{–}2)(A+B+C)(M2+M3)(E)$ $L64\text{–}3$=End of test.

CONVERSION OF BOOLEAN EXPRESSIONS TO LOGICAL BLOCKS

Rather than drawing the logic diagrams for each of the Boolean expressions just set forth, only several will be drawn in in detail. From this teaching of the mechanics of the conversion from the Boolean expressions to logic diagrams, it will be apparent how the remaining expressions should be converted.

*Test 001*

Figure 2:
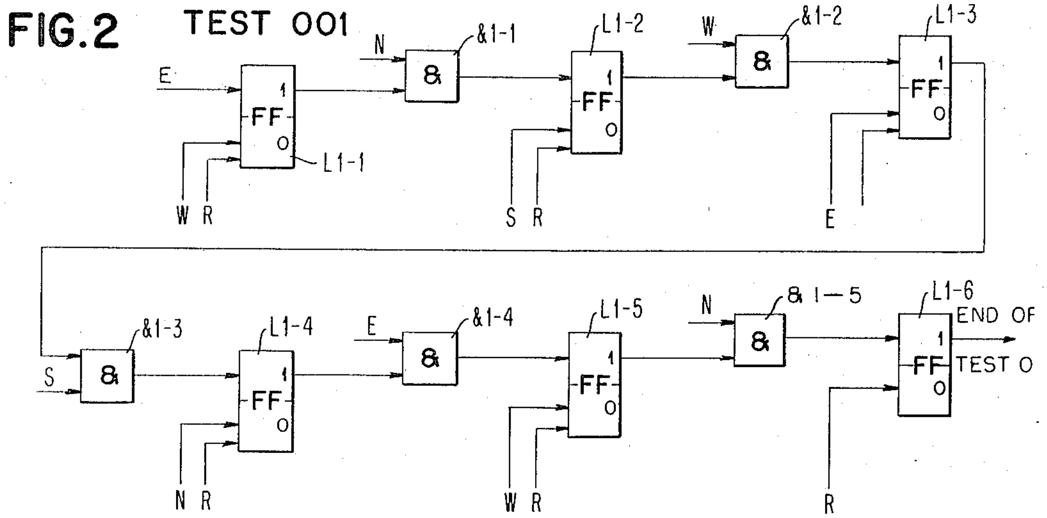
FIG. 2 is a schematic logic block diagram of Test 001.

Turning now to the Boolean expression for Test 001 (supra) and its implementation in Logic blocks shown in FIG. 2, it will be seen that the success of the test requires the successive energization of six latches by the successive vector headings, E, N, W, S, E, and N without intervening occurrences of the respective opposite headings. This succession of vectors denotes a counter-clockwise rotation, and can only occur if the curve follower follows on the inside of a closed path for one and one-half revolutions. Since the follower normally tracks clockwise on the outside of a figure, this inside trace can only be achieved if the tracing beam is inadvertently trapped on the inside of a figure.

The logic block diagram (FIG. 2) includes the latch L1–1, having a set input connected to the East (E) line 40*a* of slope detector 40 (FIG. 1) and the reset input connected to the West (W) line 40*a*. The set output line from L1–1 is ANDed in &1–1 with a N vector signal to set L1–2, which resets on an S signal from the slope detector. Each succeeding latch in the series is set by a combination of an output from the preceding latch and the requisite heading signal. It will be noted that latch L1–6, once set has no reset premised on conditions precedent. Thus, if this latch is set, the test success will be stored in the latch until reset by a master reset pulse R applied to it and all other latches to restore them to the reset condition. Once a latch sets the next succeeding latch, its reset will not break the sequence. For example, latch L1–1 will reset on a West signal concurrent with the setting of latch L1–3. However, since the set of latch L1–2 has intervened, the reset of latch L1–1 will not prevent the setting of latch L1–3.

Test 001 represents the simplest implementation of the Boolean expressions and is valuable as an introduction to the rationale of the operation. It incorporates no time delays, nor other complicating factors.

*Test 002*

Figure 3:
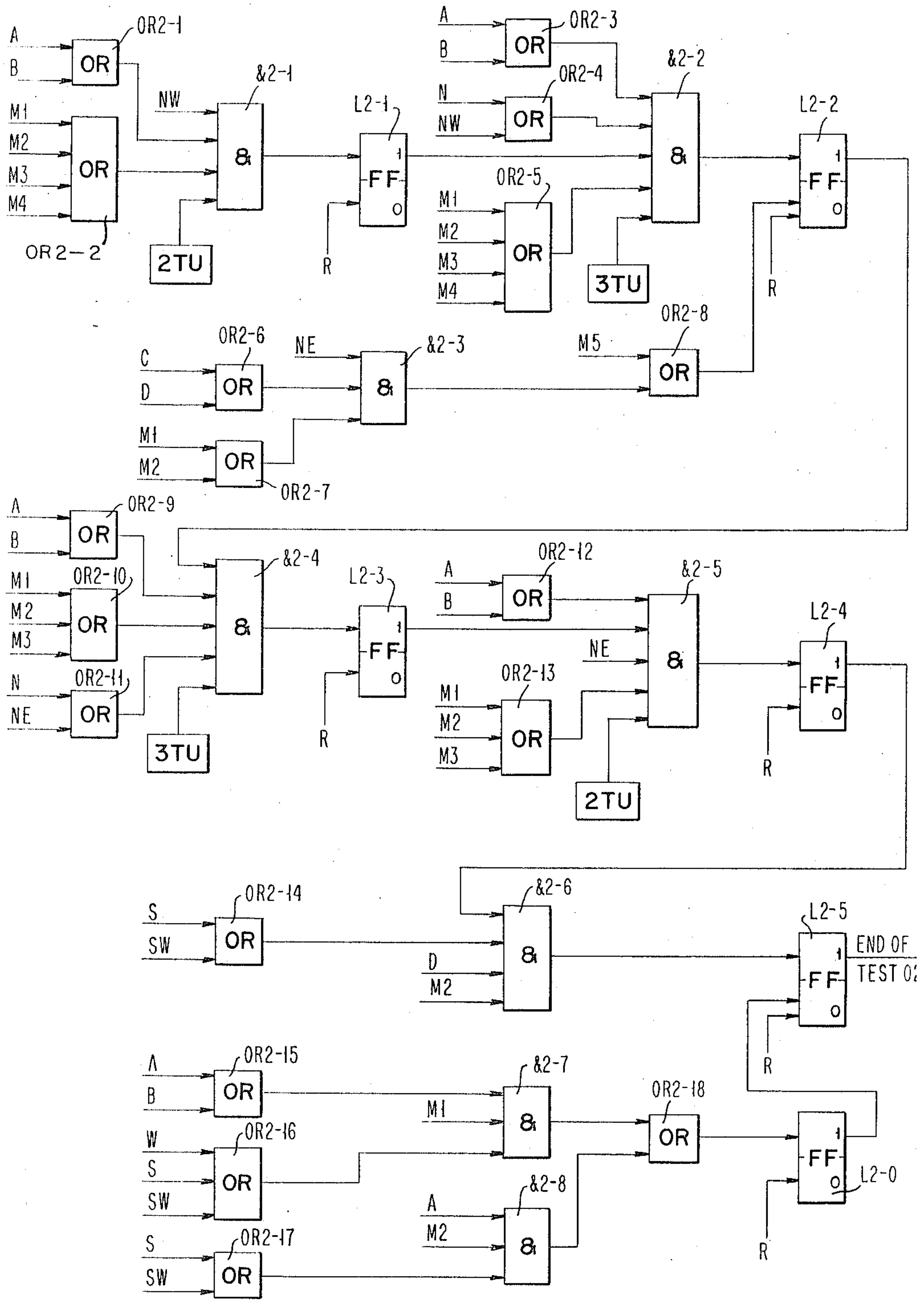
FIG. 3 is a schematic logic block diagram of Test 002.

This test illustrates the absolute nullity condition, as well as the use of time delays. Its implementation in logical blocks is shown in FIG. 3. Latch L2–1 requires the ANDing of several alternative conditions. This is achieved in AND gate &2–1 having as inputs NW and the outputs from OR gates OR2–1 and OR2–2. Gate OR2–1 "OR's" the column signals A or B from the matrix resolver 30 (FIG. 1). Gate OR–2 receives inputs M1, M2, M3, M4 as the row signals from the matrix resolver 30. AND gate &2–1 requires that the three inputs occur simultaneously and uninterruptedly for two time units in order to produce an output response to set latch L2–1. Latch L2–1 has no conditioned reset, and is thus reset by a master reset pulse R as indicated.

The second latch L2–2 of the series in Test 002 is set by the ANDing (through AND &2–2) of three OR conditions (OR2–3, OR2–4, OR2–5) with the set condition of the preceding latch L2–1. The respective OR gates combine the conditions precedent as shown in FIG. 3. The AND gate &2–2 has a three time unit delay. Reset of latch L2–2 is achieved via the master reset pulse R, or the output of OR gate OR2–8, which alternatively combines an M5 input with the output of AND gate &2–3, this latter gate combining a NE signal and the outputs of OR gates OR2–6 and OR2–7. The last-named OR gates respectively receive inputs of C or D and M1 or M2.

The energization of latch L2–2 sets latch L2–3, if the conditions precedent for the energization of AND gate &2–4 are satisfied for the requisite three time units. Latch L2–3 has a master reset only. The latch L2–4 is set by the combination of conditions shown in FIG. 3, as is the final latch L2–5. If the final latch L2–5 is set and the nullity latch L2–0 remains reset, the Test 002 is satisfied.

The latch L2–0 has the capability of destroying the success of the test at any time, as opposed to the other latch resets, which must occur before the set condition is utilized, to set the next succeeding latch. This nullity latch L2–0 is set by the alternative (through OR2–18) energization of AND gates &2–7 or &2–8. AND gate &2–7 is energized by M1 and A or B, and W or S or SW. AND &2–8 is energized by A, and M2, and S or SW.

As the test title signifies, Test 002 seeks to distinguish the rounded top of a "9" from the line-ended top of a "2" or "7." Essentially, the test looks for two time units of NW (L2–1) followed by three time units of N or NW (L2–2), for three time units of N or NE (L2–3), followed by two time units of NE, all in the upper left corner of the matrix, and a final S or SW vector in the second row of the last column [(D)(M2)] to set latch L2–5. The succession of vectors in the upper left-hand corner can only be satisfied by a rounded line without sharp discontinuities, as in the usual "2" or "7." A "2" with a gently curved, almost closed loop at the top would, however, satisfy the tests. Generally, the top of a "2" would, at most, start with an N vector and would not satisfy the conditions for latch L2–1. The "7" on the other hand has no curved shape at its upper left, and thus, could not satisfy the test. The nullity latch L2–0 will negate the test for all "2's" (except a looped "2"), "7's," and open looped "9's." The nullity condition ocurs if a W, S, or SW vector occurs in the upper two left squares (A1 or B1) of the matrix, or an S or SW vector in A2 of the matrix. This nullity condition will exist with a "7" (W in A1 or B1), in an open looped "2" (S or SW in A2), or in an open looped "9" (same as open looped "2"). With the nullity condition established, the positive tests, even if they are satisfied, will be cancelled.

While the reset for latch L2–2 may not seem necessary, the test sequences have been devised by analyzing countless handwritten symbols, and providing safeguards against the countless variations of human handwriting. For example, a "9" with a long curved tail, an elongated loop, and pointed top would fail this test. The normalizing operation, because of the long tail, would move the pointed flat loop into the upper right corner and thus provide an NE vector in $(C+D)$ $(M1+M2)$ to reset latch L2–2 before three units of N or NE could be accumulated in $(A+B)(M1+M2+M3)$ to set latch L2–3). A right tilted "8" could produce the same result. Since the logic for combining tests to identify a given character offers many alternative, and frequently redundant paths, the failure to pass any given test will not prejudice the recognition. This will become apparent when the logic is examined.

*Test 019*

Test 019 tests for the loop of a closed "6." It detects the sequence of a south vector on the right of the character (L19–1), followed by a persistent SW or W around the bottom of the character (L19–2), followed by an E or SE vector along the loop. These conditions are represented by the Boolean expressions previously set forth, which expressions also set forth those conditions which will negate the test. For example, latch L19–4 could be set following the requisite sequence of operations in following an "8" open at the top right corner. However, when the trace rounds the upwardly projecting line defining the right side of the break, it will move upwardly and to the right. As soon as it rounds the line end and starts downward, it will move in an SW direction in $(C+D)(2)$ to reset latch L19–4 and prevent the integrator I19–1 from functioning because it lacks a condition precedent for its operation. Integrator I19–1 can also be prevented from operating by the reset of latch L19–5, this being a latch associated with an integrator which discharges the integrator upon reset of the latch.

Figure 4:
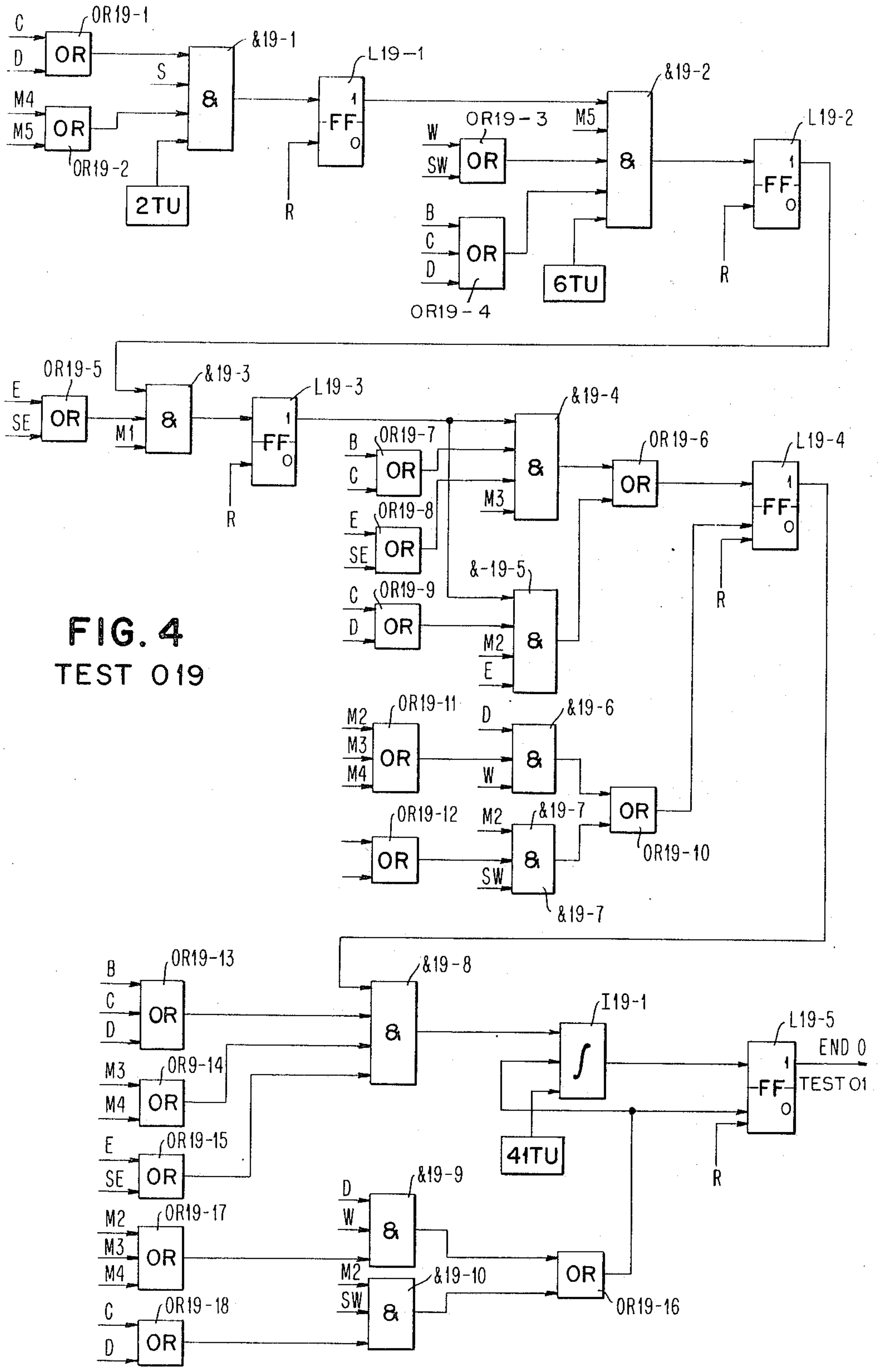
FIG. 4 is a schematic logic block diagram of Test 019.

The logic block implementation of the Boolean expressions for Test 019 is shown in FIG. 4. The first latch L19–1 is set by the output of AND &19–1 which tests for two time units persistence of C or D (OR19–1), and M4 or M5 (OR19–2) and S. Latch L19–1 has only a master reset. Latch L19–2 sets with six time units (&19–2) of L19–1 and W or SW (OR19–3), and B or C or D (OR 19–4). Latch L19–2 sets with six time units (&19–2) of L19–1 and W or SW (OR19–3), and B or C or D (OR19–4). Latch L19–2 has only a master reset.

The energization of latch L19–3 proceeds from latch L19–2 ANDed (in &19–3) with M1 and E or SE (OR19–5). Latch L19–3 has only a master reset. Set of the next succeeding latch L19–4 is alternatively (OR 19–6) from &19–4 or &19–5 both of which require the set of L19–3 as an input. AND &19–4 also requires M3 and the ORed inputs B or C (OR19–7) and E or SE (OR 19–8). AND &19–5, in addition to L19–3, requires inputs of M2 and E and C or D (OR19–9). Latch L19–4, in addition to a master reset, has a conditional reset in the alternative (from OR19–10) from &19–6 or &19–7. Gate &19–6 AND's D and W with M2 or M3 or M4 (through OR19–11). Gate &19–7 AND's M2 and SW with C or D (OR19–12).

The setting of the final latch L19–5 depends for its operation upon the accumulation of four integrated time units of the conditions precedent in AND &19–8. These conditions include latch L19–4 and B or C or D (OR19–13) and M3 or M4 (OR19–14) and E or SE (OR19–15). If these conditions exist (although intermittently) for four time units the integrator I19–1 will achieve the threshold necessary to set latch L19–5. The latch L19–5 has both a condition reset and a master reset, and since the latch L19–5 is associated with the integrator I19–1, its reset will also reset the integrator as shown. The implementation of the logical expression $\overline{L19-5}$ is through OR 19–16 whose inputs are taken from &19–9 or &19–10. Gate &19–9 AND's D, W, and M2 or M3 or M4 (OR19–17). Gate &19–10 AND's M2, SW, and C or D (OR19–18).

The logical implementation of the Boolean expressions for Test 019 thus illustrates the use of persistent time units, integrated time units, as well as conditioned resets for latches.

TESTS FOR RECOGNITION OF NUMERAL "3"

Since the total logic and tests for identifying the numeral "3" will be explored in depth, the implementation of the feature tests therefor will now be traced. The logic to identify the numeral "3" employs Tests 004, $\overline{017}$, 021, and 022. Each of these will now be treated.

*Test 004*

Test 004 is implemented in logic blocks as shown in FIG. 5. Except for the different input signals in the various logical combinations of AND's and OR's, the diagram follows the same basic principles of the other tests. The sole feature distinguishing this test is the OR gate OR4–11 which requires two time units of either output from the connected AND gates &4–4 or &4–5. Since AND gates and OR gates, particularly where signal polarities are involved, are substantially similar, this represents no radical departure from the time delay AND gates previously employed. An AND gate with inverted inputs and an inverted output functions as an OR gate. Expressed in other terms, an OR function is the mere inversion of the NOT AND function. Thus, the same time delayed logical AND block may be employed with inverters to yield a time delayed OR block.

The cusp determination Test 004, as implemented in FIG. 5, is shown applied to the trace superimposed on the synthetic 4 x 5 matrix in FIG. 5A. All latches are initially reset by the master reset impulse at the beginning of the following action. Assuming that the curve follower starts its curve following action proceeding SE in square M2–D, all latches will remain reset until the trace rounds the lower line end in square M5–A and intercepts the upward sweeping curve. At this time, the trace will occupy rows M5 or M4 with a NE vector to set latch L4–1 as shown by the labelled arrow in FIG. 5A. Since no minimum persistence time is imposed, this set of latch L4–1 will occur as soon as the trace turns NE. The circuits to achieve this action include (in FIG. 5) OR gate OR4–1 (with inputs $M3+M4+M5$) and AND gate &4–1 with inputs of NE and the output of OR4–1. Latch L4–1 once set, remains set until row M1 is attained, as shown by the heavy dot labelled $\overline{L4\text{–}1}$ in FIG. 5A. However, the set condition of latch L4–1 will be used to set latch L4–2 before L4–1 is reset; otherwise, the test would fail.

When the trace proceeds upwardly and to the left in the lower curve and a NW heading is first achieved, time begins to run, since the trace occupies columns B, C, or D (OR4–2) and rows M3 and M4 (OR4–3) with a NW or W (OR4–4) heading. When two time units of these conditions are sensed in gate &4–2, latch L4–2 is set. This region of activity is shown in FIG. 5A by the curved arrow labelled L4–2.

Although latch L4–2 resets in either row M5 or row M1 (with an E or SE vector), its set condition will be used before this reset can occur. The reset is achieved, as shown in FIG. 5, through $OR4\text{–}5(M5+\&4\text{–}3)$, $\&4\text{–}3[(M1)(OR4\text{–}6)]$ and $OR4\text{–}6(E+SE)$.

With latch L4–2 set, the trace, after it rounds the apex of the cusp in M3–B will soon achieve an E or NE heading in rows M2 or M3 and columns B, C, or D. This persistent (at least two time units) of alternative headings sets latch L4–3 in the region of the arrow labelled L4–3 in FIG. 5A. This setting action (for the trace illustrated) would actually proceed through $OR4\text{–}7(B+C+D)$, $$OR4\text{–}8(M2+M3)$$

$OR4\text{–}9(E+NE)$, $\&4\text{–}4[(OR4\text{–}7)(OR4\text{–}8)(OR4\text{–}9)]$ and $OR4\text{–}11(\&4\text{–}4+4\text{–}5)$. The two time units are measured in OR4–11. In the instance chosen, the gate &4–5 would probably yield no output, as this gate functions to detect an angular "3" with a flat top, as witness the required NE heading in M1 and C or D. It is to be noted, however, that the angularly drawn "3" has a cusp.

The reset of latch L4–3 will not interfere with the normal setting of the next latch L4–4. Reset of L4–3 occurs in M1–D as shown in FIG. 5A when the vector heading turns SE. This reset, shown in FIG. 5, occurs through OR4–12 which combines the outputs of &4–6 or &4–7 as shown. Gate &4–6 combines $OR4\text{–}13(M1+M2)$ and $OR4\text{–}14(S+SE)$. Gate &4–7 combines D, and M1, and $OR4\text{–}15(E+SE)$. This reset cannot obtain until the trace achieves an E heading in D, M1–1 as a minimum, this action occurring long after the set of L4–3 is utilized.

With L4–3 set, latch L4–4 will be set in the region shown by the labelled arrow in FIG. 5A. This region, and the conditions precedent, for the set of L4–4 are set forth in the Boolean expressions as:

$$L4\text{–}4=(L4\text{–}3)(M1+M2)(W+SW+NW)(6TU)$$

This expression is implemented in the final stage of FIG. 5, wherein L4–3 is ANDed with the output of OR4–16 and OR4–17 in gate &4–8 for six time units to produce the latch setting output, OR4–16 combining M1 or M2 and OR4–117 combining W, SW, or NW.

From the foregoing it will be seen that by the logical "ORing" of various vectors and matrix positions, considerable tolerance in the configuration of the feature being listed may be had. Thus, for example, the test will recognize a cusp so long as it does not lie in the extreme rows of the matrix, a highly improbable shape, considering that reasonable restrictions must be placed on the formation of the character.

It might be noted in passing that, although the cusp of the "3" is rather rigorously definitive of the numeral, there being no other numeral with a similar cusp, Test 004 alone will not identify a "3." Test 004 is positively required, but so also is Test 021 and the alternative presence of Test 022 or absence of Test 017.

*Test $\overline{017}$*

Test 017 is employed negatively in the logic which identifies the numeral "3." Test 017 tests for a gently rounded bottom in the lowest row M5 of the matrix. Even though this feature is characteristic of a "3," its negative inclusion in the logic is offset by the positive inclusion of Test 022. This is but one of many examples of apparent inconsistencies in the logic that have been found necessary because of the innumerable variations in human handwriting. The testing of the many samples of writing produced sufficient samples of "3's" to dictate the negative logic of a round bottom balanced against a line-ended round bottom.

Test 017 is performed entirely in the lowermost row of the matrix and looks for six integrated time units of W or SW vectors in M5. These conditions are "ANDed" in gate &17–1 and accumulated in integrator I17–1 for six integrated time units to set latch L17–1. This accumulation must occur before row M4 is reached, as I17–1 resets on M4. Latch L17–1, together with a W or NW(OR17–2), and M5 are combined in &17–2 and their persistence measured in I17–2 which yields a latch setting output after five integrated time units to set latch L17–2 and complete the test. Since I17–2 resets on M4, the accumulation must be achieved totally in row M5. Since it will be recalled that the beam traversed one matrix block (horizontally or vertically) in approximately six time units, the curved bottom of the "3" illustrated in FIG. 6A contains about fourteen or fifteen time units of gently changing slope, as opposed to the required eleven time units total of transition from SW to W to NW, with W common to both integrators. The round bottom of a "3" may, therefore, produce an output of Test 017.

The beam trace for a gently rounded "3" is shown in FIG. 6A. As soon as the beam, tracing in a clockwise direction, crosses the boundary between M4 and M5 on the right side of the lower loop, the shape is generally SW. Thus, time begins to accumulate in integrator I17–1 such that the required six time units will be achieved about the time that the beam is ready to cross the boundary between M5–C and M5–B. With this time accumulation, L17–1 is set at the head of the arrow in FIG. 6A, and line accumulation begins in I17–2, since the conditions precedent for operation of I17–2 are satisfied. This accumulation continues for five time units until approximately the boundary between M5–B and M5–A. This accumulation and latch setting is shown in FIG. 6A by the labelled arrow (I17–2) and the lead line from "L17–2" to the arrow head. Thus, it will be seen that Test 017 will yield a positive test of a round bottom figure including a "3."

*Test 021*

Test 021 tests for the top of a "2," "3," or "7" and involves the setting of three successive latches which measure the upward sweep in a NE, N or NW direction common to the reentrant shape of the three numerals, followed by a NW, W, or SW sweep on the underside of the upper portion of the characters, and finishing with an E movement on the top of the character all with measured time persistences.

The foregoing sequence of events, as applied to the numeral "3" is shown in FIG. 7A, and the logic block implementation thereof in FIG. 7. As soon as the trace crosses the boundary between M3 and M2, the slope is roughly NE and the matrix position of M2–D satisfies the prerequisite conditions for gate &21–1 to accumulate time in I21–1. As the vector swings from NE to N to NW, gate OR21–3 continues to yield an output as OR21–2 and OR21–1 to continue the time accumulation. By the time that the trace crosses from M2 to M1, the AND gate &21–1 has probably measured the requisite three time units to set latch L21–1, this action being shown in FIG. 7A by the appropriate labelled arrow positions. With the setting of latch L21–1 and the requisite conditions for $$\&21\text{–}3[\&21\text{–}3=(M1+M2)(W+SW+NW)(L21\text{–}1)]$$

time will begin to be accumulated in I21–1 to set latch L21–2 somewhere within square M1–B. Finally, the east vector in M1 will set latch L21–3 after two time units, as shown. It will be noted that the resets for L21–1, I21–1, L21–1, and L21–2 occur after they have been employed to set the next succeeding latch, so as not to destroy the sequence of the test. While the test has been shown as applied to a "3," it should be readily apparent that it will equally well apply to a "2." The "7," although angular, will certainly yield a persistent NE vector, followed by a persistent W vector, followed by an equally persistent E vector to satisfy the test.

*Test 022*

This test examines the character in the bottom two matrix rows for a generally western progression followed by a generally eastern progression, a feature present in the curved bottoms of a "3," "5," and curved tail "9." Other numbers having a flat bottom, such as a "2," because of the clockwise trace, has an east vector followed by a west vector in the bottom two rows but not the converse.

The Test 022 is implemented by the logic devices shown in FIG. 8 wherein the action starts with AND gate &21–1 with a west vector and M5 inputs for two time units to set latch L22–1. The set condition of L22–1 "ANDed" with M4 or M5 (OR22–1) and E or SE (OR22–2) for two time units sets latch L22–2. An E or NE (OR22–4) and (&22–3) M4 or M5 matrix position (OR22–3) for two time units sets latch L22–3 to complete the test.

The results for the various latches include M1 for L22–1, and M5 and W (&22–3) for L22–2. Normally, the test conditions will have been satisfied before these resets can be active to upset the test. On the other hand, an open-topped "0" would produce the same vector sequences and satisfy the test, except for the safety resets. With an open "0," latch L22–1 would be set with the west vector at the outside bottom of a "0." However, L22–1 resets in row M1. Therefore, if the beam had to travel through row M1 to get inside of an open-topped "0," L22–1 would reset to prevent setting of L22–2 when the beam traced the bottom inside curve of the open "0."

The relative action positions of the various latches are shown in FIG. 8A. The bottom arrow labelled L22–1 and L22–2 represents the region where &22–1 is active to set L22–1, and &22–3 active to reset L22–2. The arrow labelled L22–2 represents the active area for &22–2 to set L22–2. The final arrow represents the conditions precedent for operation of &22–3 and L22–3. The arrow lengths are not to scale and do not represent time persistence. Generally speaking, it requires about six time units to traverse the length or width of one matrix position, and derivatively about eight and one-half time units to traverse the diagonal of a matrix square. Thus, it will easily be seen that there is more time than necessary to fulfill the time requirements of the conditions precedent to the operation of the various gates.

LOGIC FOR IDENTIFICATION OF NUMERAL "3"

The logic for combining the test results just described is shown in FIG. 9. Remembering that each test success is stored in a latch, such as the latches L4–4 (FIG. 5), L17–2 (FIG. 6), L21–3 (FIG. 7) and L22–3 (FIG. 8), these potentials supplied by the latches are applied to the logic gates in FIG. 9 as shown by the labelled hubs. OR gate, OR193 is wired to the latches L22–3 and L17–2 (through an inverter). AND gate, &2–3 is wired to OR193 and to L4–4 and L21–3. If the conditions just set forth are satisfied, &2–3 yields an output to set L203 to store the recognition.

The recognition of the numeral "3" requires the positive test for a cusp (Test 004), and the "2," "3," or "7" top (Test 021 )and the absence of the round bottom test (Test 017) or the presence of the bottom curved tail of a "3," "5," or "9." With the single OR gate in the logic shown in FIG. 9, there are only two alternative conditions for the recognition of the numeral "3." This is the simplest recognition of any of the ten numerals, and will identify the conventional two arc numeral and the single arc topped by a straight-sided acute angle configuration.

LOGIC FOR IDENTIFICATION OF NUMERAL "1"

The logic for identifying the numeral "1" is shown in FIG. 10 together with the required presence or absence of feature test inputs indicated by the numbered input hubs. Although the whole of the logic will not be analyzed, it is significant to note that the final recognition is vested in the OR gate 201 which receives inputs from Test 038 or the output from AND gate 120. If Test 038 is satisfied, no other tests are required for identification. Test 038 is a test for the so-called "pedestal 1." This configuration includes a horizontal bar at the bottom of the vertical bar and usually a small diagonal appendage connected to the upper end of the vertical bar. Failing a "pedestal 1" test, recognition of the numeral "1" requires an output from AND gate 120, which gate requires an inversion of AND gate 150 and OR gate 121 together with the absences of Tests 009, 018, 020, and 056 and the presence of Test 008. AND gate 150 is a required positive input for identification of a "0" (see FIG. 18). OR gate, on the other hand is a sort of safety gate, in that it prevents recognition if certain conditions are met. For example, if either of the Tests 009 or 022 is present, recognition will fail. Test 009 tests for open "8's" or open "9's," which, if present, will destroy the recognition. Test 022 is the round bottom test previosuly analyzed in detail with respect to the numeral "3" logic and associated tests. The other inputs to OR121 are more elusive in that they involve more logic. AND 133 might be generally characterized as a positive logic requirement for the numeral "4" (see FIG. 12). OR gate 114 will prevent recognition upon the presence of Test 014 (bay of a "6") or Test 019 (loop of closed "6"s"), or Test 049 (stem of "6"). Thus, gate 114, a required positive component of the "6" identification logic (see FIG. 14), prevents confusion between a "1" and "6." AND gate 221 prevents recognition if a top of a "2," "3," or "7" (Test 021) and no top of an open "4" (Test 006) are found to exist.

If any one or more of the combinations of feature tests made acceptable by the logic of FIG. 10 is present, the latch L201 will be set to manifest the identification. If this is the only identification latch set, then the character has been successfully identified. If more than one latch is set, then as will be explained, other routines will be called into play in an effort to resolve the ambiguity.

LOGIC FOR IDENTIFICATION OF NUMERAL "2"

Recognition of the numeral "2" requires the combinations of feature tests shown in FIG. 11 to activate AND gate 202 to set the identification latch L20-2. It is noted that the final gate requires the absences of three features ($\overline{004}$, $\overline{020}$, $\overline{038}$) and the presence of one (021), as well as outputs from AND gate 169 and OR gate 172. AND gate 169 can be characterized generally as a positive "2" gate in that the inputs thereto all involve tests for features of a "2". For example, Test 026 tests for the bottom of a "2" and Test 029 for an "accountants 2," either of which through OR gate 126 will yield one of the inputs for AND gate 169. OR gate 161 provides for alternative inputs of a "2" tail (Test 061 or Test 028) bend on bottom of a "2" (Test 062) "looped 2" (Test 029 through AND 129), and the NOT OR gate 112 output which protects against top of "9" (Test 002 or 012). OR gate 172 is a safety gate in that inverted inputs to it are required. OR gate 113, for example, is an alternative requirement for a "5" (see FIG. 13) or a "6" (see FIG. 14). OR gate 171, although not used in the logic of other numerals protects against round bottoms (Test 022) or the line ended bottoms such as those in a "4" or "9" (Test 023).

If all of the necessary feature tests are present in any one or more of the alternative combinations permitted by the logic of FIG. 11, the latch L202 will be set to manifest the recognition. As with all recognition latches, this latch will be tested along with the others to determine if one and only one is set; if none is set, or certain combinations are set to regulate the future course of action of the apparatus.

NUMERAL "4" LOGIC

The logic combinations for the recognition of the numeral "4" are shown in FIG. 12. Like the logic discussed previously, this logic involves various alternative combinations of the presence or absence of the various feature tests, the Boolean expressions for which have been set forth in detail. The recognition terminates in AND gate 204 which sets latch L204. AND gate 204 has the six inputs shown, two of which are the inversions of Tests 004 and 009, the former testing for a cusp of a "3" and the latter for an open "8" or "9." The remaining four inputs for AND 204 are the outputs from other logic elements as shown, for example, $\overline{221}$, 152, 133, and 106. These logic elements in turn require direct feature test inputs or outputs from other cascaded logic elements. Without laboring through all of the combinations, it should be noted in passing that, in this, as in all of the recognition logic for the various numerals, the inverted inputs are safety gates to prevent recognition. In the instant logic, Tests 009 and 004 are inverted into AND 204 as is the output of AND 221. In the lower echelons of the logic OR113 is inverted into AND 105. Tests 006, 010, 017, 020, 050, 051, and 059 are also inverted. Generally speaking, tests into an OR function are more powerful than those into an AND function, assuming, of course, that the gates are at a comparable echelon level. For example, Test 03 (right level of a "4") as an alternative input to OR gate 106 is equal in effectiveness to Test 052 (bottom of "4" in M5) since OR152 and OR106 are at the same level in the logic. Test 052 (through OR110), however, is less effective than Test 003 (into OR106) because AND 133 also requires the absence of Tests 010 and 020.

In all of the logic, including that for the recognition of a "4," there is much redundancy and seeming inconsistencies. As has been previously stated, many samples of handwritten numerals of known identity were analyzed. The success and failure of various tests were tabulated, and the results of these tabulations employed to modify both the feature tests and the recognitton logic to identify even borderline characters successfully. But one of many examples of resolvable conflicts is that between an open "4" and a continuously stroked "8" with an open top loop and a very narrow bottom loop, approaching a thick line. Here the "8" has the characteristics of a "4," including an upwardly pointed bifurcated top and a substantially line ended bottom. However, the "8," even though it be open, has a certain roundness to it, as opposed to the angularity of a "4." The "4" on the other hand, may have a right tail which certainly distinguishes over an open "8" with a skinny bottom. All of the various possible configurations, as manifested by the samples, have been machine tabulated and analyzed so whereby feature tests and logic have been modified to reflect accurately all of the differences of human handwriting. Were one able to visualize all of the possible shapes that recognizable numerals might assume, and the interplay of the various features among the characters to the depth to which a computer can analyze these variables, he would only then begin to comprehend the necessary redundancies and apparent inconsistencies in the tests and in the logic. It is only by analysis of thousands of samples from different hands that the instant logic is evolved.

NUMERAL "5" LOGIC

Next to the logic for the identification of the numeral "3," that shown in FIG. 13 for recognizing a "5" is probably the next simplest. As is shown in the drawing, the logic employs the results of thirteen feature tests five logical elements, including the final AND gate 205 which employs a single input from lower echelon logic through OR gate 134 and the results of Tests 022, $\overline{004}$, $\overline{006}$, and $\overline{030}$, the latter three tests being entered inversely as a NOT function. Test 022, entered positively, will be remembered as the round bottom test previously described. Test 004, entered negatively, is the "3 cusp." Test 006 is the open top "4" test, and Test 030 is the open "9" test. Positive identification from OR134 includes the presence of Test 013 (long top of 5) or Test 043 (straight top of 5). Other than this simple combination, the alternative input to OR134 requires an output from AND 115 with its conditions precedent, including one positive Test 023 (underbelly of "4" or "9"). Any conflict with "4" engendered by Test 023 is resolved by requiring an inverse of Test 003 (right test of "4"), and an inverse of Test 005 (top of closed "4"). The "5" open "9" conflict is prevented by the inverted input of Test 030 into AND 205. Several other safety entries are employed, namely inverted Test 015 (top of "8"), inverted Test 010 (open "6"), and inverted Test 020 (open "0"). The final inverted input from AND 221 safeguards against a "2," "3," or "7" to the extent that Test 021 detects the top configuration of these numerals, and an open "4" is also present. When AND gate 205 is energized, it sets latch L205 to manifest the recognition.

NUMERAL "6" LOGIC

The logic block diagram for the numeral "6" is shown in FIG. 14. Like the remaining recognition logic, it employs combinations of AND gates and OR gates with the feature test inputs as shown. Again, as in the "1" recognition logic (FIG. 10), the final recognition gate is an OR gate (206). The gate 206 has an input of Test 010 and the output from AND gate 198. Obviously, Test 010 can alone provide recognition. This test is labelled in the Boolean expressions as an "open 6" test, and, if found, is a very powerful recognition feature.

Lacking an open "6" AND gate 198 and all of its attendant lower echelons of logic must be energized. Although gate 198 is an AND gate, the inputs thereto are essentially OR gates, permitting of many alternative combinations in the lower echelons. Some of the positive tests include Test 014 (bay of "6"), Test 012 (loop of closed "6"), and Test 049 (stem of "6" in M1–0), all "ORed" in OR gate 114. The inversion of the output of OR170 makes this a form of a safety gate, in that the presence of any input thereto will destroy the necessary input to AND 198. Effectively, therefore, Tests 020, 030, 056, 055, 015 and 022 (all inputs to OR170) should not be present. So, also, should AND gates 133 and 221 yield no output. Any input to OR170 will negate the input to AND 198 and negate its effectiveness. OR gates 111 and 191 are positive gates permitting alternative inputs. Gate 111 will be energized if Test 011 fails (top of "8"), or Test 013 (long top of "5," horizontal or upwardly slanted) or Test 043 (straight top of "5" or "6") is present. Gate 191 safeguards against Test 037 (straight horizontal top of "5") or adds to the recognition if Test 041 (straight left side of "6," "8," or "0") is present. If OR gate 206 yields an output, latch L206 is set to store the recognition.

NUMERAL "7" LOGIC

The logic for the recognition of a numeral "7," shown in FIG. 15, terminates in AND gate 207 to set the recognition latch L207. All of the feature tests entered directly into AND 207 are inverted to prevent recognition if a "3" cusp exists (Test 004), or if an open looped "8," or "9" (Test 009), an open "0" (Test 020) or a curved bottom tail of a "3," "5," or "9" (Test 022) exist. These inputs could be equally well positively "ORed" and the OR output entered inverted into AND 207. The remaining lower echelon logic gates produce outputs which may be roughly characterized as follows OR126 ("2" positive logic), OR16′ ("2" positive logic), OR157 (positive "7" logic), and OR118 (positive "2" logic or line ended bottom). AND 119 includes a positive "7" test (Test 007), a positive "7" logic input (OR157), and a more or less positive "7" logic input (OR118 with NOT Test 017). The positive "2" logic weighs heavily in the "7" logic, because the only difference (neglecting curvature) between the two numerals is the tail of the "2." If a "2" should feed through OR118, it will be offset by the inverted output of OR126 to prevent recognition. This scanning inconsistency is intentionally entered into the logic to permit the recognition of the borderline characters found among the samples tested.

NUMERAL "8" LOGIC

The logic for the numerals "8" (FIG. 16), "9" (FIG. 17), and "0" (FIG. 18) all involve what is termed second pass logic, in that the logic is capable of recognizing a character after the second trace thereof. However, if conflicts arise as between an "8" and "0" or "8" and "9," the conflict will be stored and a third pass made at the character with a special trace to resolve the ambiguity. By this expedient the over-all accuracy of the machine is improved as the third pass unequivocably resolves the ambiguity.

Final recognition of an "8" is vested in AND gate 208 to set the second pass recognition latch L208. Of the inputs to AND 208, two are inverted and two are entered positively. The NOT OR174 entry may be generally characterized as a "NOT 9" entry. OR gate 174 is used positively in the "9" logic (FIG. 17). The inverted input from OR103 is a safeguard entry to prevent recognition if Test 006 (open "4") or Test 022 (tail of "3," "5," or "9"), or Test 050 (bottom of loop of "9") exist, or if Test 021 (top of "2," "3," "7") and the absence of Test 006 (open "4") exist.

OR gates 117 entered positively permits the alternative entries of Test 009 (open loop "8" or "9"), Test 017 (round bottom), or Test 018 (round top of "8"). These are all positive definitive tests for an "8." The final OR gate 196 has positive entries from OR148 or AND 177.

AND gate 177 requires NOT OR 114 to safeguard against Tests 014 (bay of "6"), Test 019 (loop of closed "6"), and Test 049 (stem of "6"), this entry safeguarding against tests for "6" features. The remaining ANDed entry to gate 177 that from OR176, are all positive feature tests for an "8." These tests include Test 041 (straight left sided "8"), Test 042 (straight right sided "8"), Test 045 (right notch of "8" with left tilt), Test 048 (right notch of "8" with right tilt), Test 018 (top of "8"), Test 055 (left notch of "8" with left tilt), and Test 058 (left notch of "8" with right tilt). The foregoing tests are combined as shown in the drawing.

OR gate 148 receives the outputs of AND gates 156, 197, and 147. AND gate 156 AND's Test 056 (left notch of "8," no tilt) with Test 042 (straight right side "0" or "8"). AND gate 197 combines Test 041 (straight left side of "0," "6," or "8") with Test 046 (right notch of "8," no tilt), and the output of OR gate 158 which in turn receives Test 011 (curved top of "8") or Test 015 (complete curved top as in "8") as alternative inputs. The final AND gate 147 requires the conjoint input from OR gates 145 and 154. Gate 145 receives the right notch feature Tests 045, 046, 047, 048, and 060. Gate 154 receives the left notch feature Tests 054, 055, 056, 057, and 058. The notch tests include the various tilts of the character.

If any one or more of the possible combinations of feature tests necessary to energize the AND gate 208 is present at the end of the second pass, the normal recognition pass, the latch L208 will be set. If this latch is the only recognition latch set, the recognition is complete. If more than one latch is set, a subsequent cycle will be initiated in a manner to be explained.

NUMERAL "9" LOGIC

The recognition of the numeral "9" at the end of a normal recognition trace is achieved by the combination of logical elements shown in FIG. 17, wherein successful recognition yields an output from AND gate 209 to set latch L209 to store the recognition success. Again, as in the recognition of an "8" and a "0," the "9" recognition logic may or may not uniquely identify the character. If a conflict is determined to exist, a subsequent cycle will be initiated to resolve the conflict.

The terminal AND gate 207 for the "9" recognition logic has six inputs, of which half are inverted inputs. One of the inverted inputs is NOT Test 019, which tests for the loop of a closed "6." A second inverted input (from AND 169) might be characterized as a "NOT 2" safeguard, in that the AND gate 169 is used positively in the "2" recognition logic (see FIG. 11), and has been previously treated in the explanation related to that figure of the drawings. The final inverted input (from OR gate 199) may best be characterized as a "NOT 8" safeguard, in that, at least as to OR gates 145, 154, and 180, the right and left notch tests for an "8" are processed. AND gates 181 and 182 "AND" the notch tests for alternative energizing circuits for OR199. This last-named OR gate also receives inputs of Test 003 (right tail on "4"), Test 004 (cusp of "3"), and Test 006 (top of open "4"). Thus, the negative inputs to the final AND gate 209 provide certain safeguards against features of a "2," "3," "4," "6," and "8."

The positive identification of a "9" includes the outputs from OR151, OR109, and OR175. The OR gate 151 has only feature test inputs from Test 050 (underside of loop of "9"), Test 051 (top of pointed "9"), and Test 005 (top of closed "4"). OR gates 109 and 175 both involve several lower echelons of logic.

OR gate 109 includes an entry of Test 030 (open "9") as well as alternative entries from AND gate 164 and 123. AND gate 164 combines Tests 009 (open loop in "9" or "8"), and 064 ("9" with opening in underbelly). The remaining lower echelon logic input to OR109 is via the AND gate 123 which receives inputs from OR112, AND 133, and NOT AND 190. OR gate 112 operates alternatively with Test 002 (top of "9" vs. "2" or "7") or Test 012 (top of "9" vs. "2" or "7"). AND 133 requires conjoint inputs of NOT Test 010 (open loop in "6"), NOT Test 020 (open "0"), and (through OR110) Test 023 (underbelly of "4" or "9"), or Test 052 ("4" or "9" with minimal length stem). Output from AND 190 requires NOT Test 001 (inside trap) and presence of an output from OR113 which in turn is alternatively energized from Test 013 (long top of "5") or Test 043 (straight top of "5" or "6"). The inversion of the AND 190 output effectively safeguards against the features of the "5" and "6" detected by OR113.

OR gate 175 is also required positively to provide the requisite inputs for the terminal recognition gate, AND 207. Inputs to OR175 include AND 164 (discussed above), AND 132, AND 178, or AND 174. AND gate 132 combines Test 032 (line end bottom) with left notch of "8," Tests 054 or 055 (through OR185). AND gate 178 has inputs of Test 017 (round bottom), Test 024 (right tilted "9" stem), and Test 047 (right notch of "8" with right tilt). OR gate 174 operates alternatively on any one (or more) of the inputs from Test 031 ("9" stem in M5–A of matrix), Test 050 (underside of loop on pendulous "9"), Test 022 (curved tail of "9"), or output from AND gate 173. This last gate "AND's" NOT Test 017 (round bottom) with OR116 which is alternatively energized by Test 016 (straight stem on "9"), Test 024 (right tilted "9" stem), or Test 025 (oscillating slope "9" stem).

The second pass logic for recognition of the numeral "9" may result in the unique recognition, by virtue of the fact that the recognition latch L209 is the only set latch. If this condition is met, the machine can proceed with identification of the next character. If more than one recognition latch is set indicating a conflict, a further recognition cycle may be initiated. This action is discussed in a subsequent section.

NUMERAL "0" LOGIC

The schematic logical block diagram for the recognition of the numeral "0" is shown in FIG. 18, the logic terminating with the OR gate 200, whose output sets the latch L200 to store the recognition.

OR gate 200 has inputs from Test 020 and AND gate 125. Test 020 tests for an open "0" and alone is capable of providing a positive recognition. Lacking the presence of this feature test, the conditions precedent for the operation of the alternative input from AND gate 125 must be satisfied. This gate has one positive test input (Test 008), two inverted test inputs (Test $\overline{010}$, and Test $\overline{038}$), one positive lower echelon logic input (AND 150) and three inverted lower echelon logic inputs ($\overline{\text{AND 169}}$, $\overline{\text{OR148}}$, and $\overline{\text{OR121}}$). Required Test 008 tests for clockwise rotation in row M5, column A, and row M1 in that order, a positive "0" test. Test 010 (required to be absent) tests for the open loop of a "6." Test 038 (inverted entry) tests for a pedestal "1."

The inverted input from AND 169 serves to safeguard against features of the numeral "2," this subcombinational logic being common to "9" recognition logic (FIG. 17) and to the "2" recognition logic (FIG. 11) in which latter use it is entered positively. The OR gate 148 by its inversion into AND 125 safeguards against numeral "8" features, the OR gate 148 being common to the "0" recognition logic (FIG. 16) when its output is used positively. OR gate 121 is common to the "1" recognition logic (FIG. 10) wherein it is also negatively employed. The safeguard provided by this gate 121 was treated in the section on "1" Recognition Logic.

Positive identification of "0" (through AND 125) requires an input from AND gate 150 which in turn requires the success of Test 033 (round bottom), the failure of Test 046 (right notch of "8," no tilt) and the failure of OR gate 161 to yield an output. By reason of the inversion of the output from OR161, the presence of either of the Tests 028 (tail of "2"), 061 (tail of "2"), 062 (tail of "2") or an output from AND gate 129 will prevent final recognition of a "0". Gate 129 will produce an output if Test 029 (loop on bottom of "2") succeeds and OR112 fails. Derivatively, the inputs of Test 002 (top of "9") and Test 012 (top of "9") must fail to prevent OR112 from yielding an output.

If the "0" logic yields an output which is non-unique, then a conflict situation exists; an additional operation of the machine is dictated.

THIRD PASS FEATURE TESTS

As has been frequently alluded to, a third trace of the character may be necessary to resolve a conflict in the recognition. This third pass may be a repeat of the second pass with no change in the basic operation of the machine, or it may be a trace of predetermined interior portions of the character. For example, if a conflict between an "8" and "0" were found to exist, the conflict could be resolved by seeking to break into the lower region of the character. The beam would break into the "8" and become trapped in the lower loop. A break through the lower end of a "9," on the other hand, would not trap the beam, as the "9" has no closed lower loop.

The distinctions just traced are detected by feature Tests 034, 035, and 036, which tests are inhibited in all but a third trace of the operation by applying constant reset potentials to the reset lines in all latches used in these tests. This constantly applied reset potential will override any set potential; and thus, prevent the latches from becoming set, except in the third cycle when the inhibit potential is removed.

Test 034 is identical in its implementation to that of Test 001 shown in FIG. 2. By analogy to FIG. 2, Test 034 would employ the successive latches L34–1, (L1–1), L34–2, (L1–2), L34–3, (L1–3), L34–4), (L1–4), L34–5, (L1–5), and L34–6, (L1–6), and AND gates correspondingly connected with inputs identical to those shown in FIG. 2. The final latch L34–6 signals the completion of the test.

Test 035, whose implementation is shown in FIG. 19, looks for an E or SE vector (OR35–2) in row M4 or M5 (OR35–1) to energize AND gate & 35–1 to set latch L35–1. With latch L35–1 set and a NE vector in M4 or M5 (OR35–4), AND gate & 35–2 will be set to complete the test.

If, as in FIG. 19A, the tracing beam is caused to pass through the line of an "8" at the position BT (breakthrough) which occurs at a point just short of the boundary between M4 and M5, it will be apparent that the trace will rotate counter-clockwise within the lower loop of the "8." This trapping action will produce the SE or E vector to set latch L35–1 in the area shown by the first arrow, and a NE vector to set latch L35–2 in the region shown by the second arrow to complete the test.

If the same breakthrough is attempted at BT (FIG. 19B) for a straight-stemmed "9," it will be apparent that the conditions precedent for the setting of latch L35–1 cannot be achieved.

If, as in FIG. 19C, breakthrough is achieved at point BT on a curved tailed "9," the trace will not be trapped. The trace will, therefore, duplicate the path it has previously traced in the second cycle. If this trace is permitted to continue, however, it will after rounding the end of the tail on the "9," duplicate the succession of vectors and matrix positions required to satisfy Test 035. However, as will be explained, the trace will be stopped in row M5 with a west vector heading (and other conditions). Thus, the conditions for the test cannot be achieved. The inside trapped trace may continue for characters other than the "9" because a W vector in row M5 cannot be achieved in the trapped counter-clockwise direction.

Test 036 is implemented as shown in FIG. 20, and test for an E vector in row M4 or M5 (OR36–1) to activate AND gate & 36–1 to set latch L36–1. This latch, together with a NW heading in M1 or M2 (OR36–2), activities AND gate & 36–2 to set latch L36–2 to complete the test. If, however, a W vector in M3 or M4 (OR36–0) occurs, then AND gate & 36–0 will yield an output to set nullity latch L36–0, and provide an overriding inhibit to latch L36–2 and prevent success of the test.

The application of the test to a "0" trace is shown in FIG. 20A. The breakthrough at BT starts the inside trace in row M4 with a N or NE vector. Nothing happens until the lower inside curve is reached when the east vector and M5 will set latch L36–1 in the region shown by the arrow thus identified. Since a W vector in M5 cannot be achieved in a trapped trace, L36–1 will remain set. When the trace rounds the upper right inside curve, it will achieve a NW heading in M1 or M2 to set latch L36–2 in the region shown by the thus-labelled arrow in FIG. 20A to finish the test.

The same test applied to an "8" as, for example, in FIG. 19A, would yield a west vector in M3 or M4 to set the nullity latch L36–0 and prevent the latch L36–2 from being set.

From the foregoing descriptions of the apparatus and functions performed by Tests 034, 035, and 036, it should be apparent that an "8" should pass Tests 034 and 035 and fail Test 036. A "9" should fail all three tests. A "0" should pass Tests 034, 035, and 036. The third pass logic should manifest these results.

THIRD PASS LOGIC

Neglecting for the moment the controls for initiating a third trace of the character following a conflict of identification, and assuming that the third trace has been made with the Tests 034, 035, and 036 uninhibited, the test results are combined in the logic elements shown in FIG. 21. The latches L208, L209 and L200 remain set or not set in accordance with the test conditions found to exist at the end of the second trace. These latch conditions are combined with the presence or absence of the Tests 034, 035, and 036 as manifested by the set or reset states of the respective terminal latches L34–6, L35–2, and L36–2, these latches being connected to the hubs in FIG. 21 identified by the test number.

Third pass recognition of the numeral "8" requires the presence in AND gate 308 of a set latch 208 (from the second pass) and inputs from OR gates 265 and 263. OR gate provides for alternative inputs of NOT SET latch L209 or an input from AND 264. The absence of latch L209 merely means that the unknown character was not identified as a "9" in the second pass, and that the third pass was probably initiated by an "8" vs. "0" conflict. If the third pass had been initiated by an "8" vs. "9" conflict, both L208 and L209 would have been set. In this instance, the third pass tests become active to resolve the conflict. As has been explained, a third inside trace of an "8" will certainly pass Test 035 and probably also Test 034. Therefore, OR gate 250 will be activated to collaborate with L20–9 in AND 264 to provide the requisite input for OR265.

The remaining input to AND 308, from OR263, will be satisfied if a "0" had not been recognized in the second pass ($\overline{L20\text{–}0}$), or if it had the conditions necessary to activate AND 262 would be satisfied. AND 262 is active when L20–0 is present and an output from AND 251. This last gate requires simultaneous inputs of Test 034 and NOT Test 036. As has been stated, an "8" will satisfy Test 034 and fail Test 036. Thus, if an "8" vs. "0" conflict existed at the end of the second pass with or without an "8" vs. "9" conflict, the third pass will resolve either or both conflicts.

The third pass cannot produce a conflict between an "8" vs. "9", "8" vs. "0" because of the following test combinations.

| | "8" | "9" | "0" |
|---|---|---|---|
| Test 034 | 1 | 0 | 1 |
| Test 035 | 1 | 0 | 1 |
| Test 036 | 0 | 0 | 1 |

The foregoing truth table is implemented in the third pass recognition logic for the numeral "9," shown in FIG. 21, particularly in the OR gate 250 whose output is inverted into AND gate 267. Thus, if either Test 034 or Test 035 succeeds, OR gate 250 yields an output, which, when inverted, fails to satisfy AND 267. Thus, if an "8" vs. "9" conflict had existed, and Tests 034 and 035 both fail, AND 267 will be activated to energize OR268, which together with the presence of L209 will produce an output from AND 309 to set latch L309. If either Test 034 or Test 035 succeeds, the third pass recognition for an "8" vs. "9" conflict must favor the "9."

The final conflict situation is the "8" vs. "0." This conflict is resolved principally in AND gate 260 where a positive response from Test 036 (passed by "0," failed by "8" and "9") and a set of latch L208 are required to produce an output. An output from AND 260 will energize OR261 which in turn will collaborate with a set of latch L200 in AND 300 to yield the recognition and set latch L300. If no "8" vs. "0" conflict had existed, then L208 would be reset ($\overline{L208}$) and OR gate 261 would be potentialized thereby. Recognition would follow because of an output from OR261 and the presence of latch L200.

From the foregoing explanation, it will be appreciated that if at the end of the second trace recognition of an unknown numeral as an "8" vs. "9", "8" vs. "0", or "8", "9" vs. "0" was had, the third inside trace is capable of resolving the conflicts.

CONTROL CIRCUITS

The operation of the control circuits 50 (FIG. 1) in providing gross deflection voltages to cause the curve follower 10 to seek out a symbol on a page, and to move from symbol to symbol will not be treated, as it is not only unnecessary to the operation of the instant invention, but also an unnecessary complication. It is sufficient to understand that the summing amplifiers 208 and 209 in FIG. 1 of the Greanias et al. copending application Serial No. 306,119, filed September 3, 1963, would be connected via the hubs **208*a* and 209*a* therein to the control circuits 50 of the instant invention via the wires 50*a* and 50*b*, and that the potentials on these lines would be so controlled as to position the beam adjacent to the successive symbols to be identified. For the purpose of the understanding of the operation of the instant invention, it is assumed that these control potentials are fixed at such a level that the beam is adjacent to an unknown symbol and capable of following it in the manner explained in the Greanias application supra. The line 50*c* connects with the terminal labelled "skip" in FIG. 1 of the copending application and is assumed to be constantly potentialized by action of the control circuit 50**.

The remaining control line 50*d* connects to the hub 261*a* in FIG. 1 of the above-identified Greanias et al. copending application, and, as explained therein in full detail, causes the tracing beam to move through the line it is following and follow on the opposite side of the line. Thus, on signal on the line 50*d*, the curve follower 10 will move inside of a closed figure and follow the interior configuration thereof. Conversely, the tracing beam can move from the inside of a closed figure to the outside thereof. This is the sole control that the control circuits 50 will exercise over the curve follower itself. The principal controls will be exercised over the feature test circuits 60 and the logic circuits 70.

The control circuits 50 receive inputs of the horizontal and vertical deflection voltages from the curve follower 10. These voltages appearing on the lines 10*h* and 10*v* are the outputs from the integrators 204 and 206 in FIG. 1 of the above-identified Greanias et al. copending application, filtered of the high frequency sinusoidal waveforms by the filters 246 and 247, the lines 10*h* and 10*v* being connected to the hubs 246*a* and 247*a*. For purposes of compatible operation, the inverter 207 in the apparatus of the copending application is eliminated, this inverter causing counterclockwise rotation. The instant apparatus requires clockwise rotation.

Since the integrators 204 and 206 as explained in the said Greanias et al. copending application, only accumulate a net charge while they are following the outline of a symbol, their initial level of charge at the moment of a first intercept with a new symbol is zero. When the follower makes a complete trace of a character and returns to its start position, the integrator voltages again return to zero. Thus, the lines 10*h* and 10*v* return to zero upon each return of the tracing beam to its initial point of interception. For the purpose of understanding the operation of the controls now to be explained, it will be assumed that the curve follower has just been positioned next to the symbol to be identified, and that the voltages on the lines 10*h* and 10*v* are both zero.

Turning now to FIG. 22 for details of some of the control circuits 50, the lines 10*h* and 10*v* are connected as inputs to the null detectors 400 and 401. These devices produce output responses of fixed amplitude only when the inputs thereto are at zero potential. By combining the output responses of the null detectors 400 and 401 in the AND gate 402, an output will appear thereat only when both null detectors detect zero potential on their respective lines. Thus, AND gate 402 yields a continuous output all during search operations when the integrators oscillate about zero with sinusoidal variations, and the filtered outputs thereof are zero. AND 402 also produces an output whenever the trace returns to the point of origin. The delay line 403 permits the trace to move away from the point of origin on the initial interception without mis-operation of the circuits. It produces a delayed output pulse on a change from non-output to output from AND 402.

When the tracing beam has intercepted the unknown symbol and is switched into the follower mode, it follows the outline of the character to produce X and Y deflection voltages on the lines 10*h* and 10*v*, which voltages are continuously processed by the resolution adjuster 20 and the matrix resolver 30. These units operate during the first or measuring pass around the character as previously explained. Normally, the latch 404 will be set to the "1" state by application of a control pulse to the start hub 404*a* substantially coincidently with the first intercept with the symbol. This start pulse would be generated by the photo-responsive circuits that detected the intercept and switch operation of the scanner from the raster search mode to the curve follower mode. For the purpose of the instant invention, it can be assumed that the start pulse is applied by any means, even manually as by a switch connected to a battery.

Assuming latch 404 to be set, when the tracing beam has completed at least one cycle (as a minimum) and returned to its starting point, AND 402 yields an output response to produce a delayed pulse output from delay line 403 to AND gate 405, which now produces an output to switch the binary trigger 406 from its reset "0" state to the binary "1" state. The trigger 406 changes state on each successive input pulse thereto, and is also known in the art as a complementing trigger. With trigger 406 in the "1" state, latch 407 will be set thereby to the "1" state also. Latch 407 will remain set until reset by a reset pulse applied to the hub R. Trigger 406, however, will alternate between the "0" and "1" binary states, being reset by a reset pulse initially so as to phase it to the operation. Therefore, because of this phasing, the trigger 406 is in the "0" state during search, and the first, third, fifth and all other odd tracing cycles. The trigger 406 is in the "1" state during all even-numbered traces. Since no more than three different traces are performed on any one symbol, the combination of states of the trigger 406 and latch 407 provides sufficient controls.

Since during the second pass the feature tests (except those used only during the third pass) must be operative, the "0" side of the latch 407 is connected to the reset hubs of all of the feature test latches (except Tests 034, 035 and 036) and to all recognition logic latches, and serve to inhibit their operation. When the latch 407 is set at the beginning of the second pass around the character, the latch reset inhibit will be removed, and the feature tests and logic will be active to perform the functions ascribed thereto in the explanation supra. When the tracing beam next completes a cycle, the trigger 406 returns to the "0" state, its "0" output "ANDed" with the "1" output of latch 407 together with a west vector and a row M5 signal in AND gate 408 signals a readout of the logic latches L201, L202, L203, L204, L205, L206, L207, L308, L309, and L300, if there is a unique identification. This control is achieved through the ten-way exclusive OR gate 409 having inputs from the recognition latches L201, L202, L203, L204, L205, L206, L207, L208, L209, and L200, as shown if any one and one only of these latches is set, indicating a unique non-conflict recognition, the exclusive OR 409 will yield an output response which together with the signal from AND 408 are combined in AND 410 to energize OR411 firing single-shot 412 to open the 10 way gate 413 to pass the latch status signals to the output circuits 70*c* for the derivation of the single-shot 412 impulse is employed to prolong the readout period beyond the transitory coincidence of W and M5. The output of OR411 also introduces a pulse input into the delay line 414 having a delay in excess of the time pulse duration of single-shot 412. The delay line 414 when it produces its delayed pulse resets latch 404, trigger 406, and latch 407 and latch 417, thus stopping operation of the feature test circuits and the logic. The reset of latch 407 resets the feature tests latches and the logic latches. The tracing beam continues to follow idly around the symbol which has been identified until deflection potentials are applied to the lines 50*a* and 50*b* to move the beam to the next symbol.

If upon the energization of AND 408 at M5 and west following the completion of the second cycle around the character, the exclusive OR gate 409 yields no output, then readout cannot be effected at this time. Exclusive OR409 will yield no output if none of the input latches connected thereto is set or if more than one of the latches are set. Therefore, if the output of the gate 409 is inverted by member 415 and ANDed with the output of the simple OR gate 417 having the same inputs as gate 409, and the output of AND 408, the AND gate 416 will yield an output following the second cycle of operation if more than one recognition latch is set indicating a conflict. The output of AND gate 416 sets the third pass latch 417. This latch from its "0" or reset side connects to the reset hubs of all of the latches in the inside Tests 034, 035, and 036, thus freeing these tests for action. The "1" set side of latch 417 is combined with the row 4 matrix signal M4 in AND gate 419 to energize over the line 50*d* (FIG. 1), the hub 218*a* in FIG. 1 of the Greanias et al. copending application Ser. No. 306,119, filed September 3, 1962, to cause the curve follower therein to seek a pass into the interior of any bottom loop of a character. AND gate 418 also energizes the delay line 420 having a delay of approximately fifty time units (slightly in excess of 1 millisecond). This delay will be adequate to permit the tracing beam to traverse one and a half revolutions with a small closed loop as in Test 034 or to get to the top of a "0" as in Test 036. At the end of the delay in delay line 420, the OR gate 411 is energized to cause readout in the same manner as before, and to reset the latches 404, 406, 407, and 417.

It will be noted that the third pass will be initiated for any non-unique situation. The third pass conflict logic may or may not resolve all possible conflicts. Therefore, after the third inside pass and the energization of the readout by a single shot 512, if the output is still non-unique, a majority logic circuit connected to the output lines will signal the lack of absolute identity. This conflict may equally well be detected by the receiving device, such as computer, which is well capable of detected signals on more than one of the lines 706.

The final situation meriting attention is the complete failure of the apparatus to identify a symbol. This situation can arise for many reasons. The symbol sought to be identified may not be one for which the machine is built to recognize, or the symbol may be so poorly formed as to defy recognition. It is important, however, to signal the failure to recognize. This is achieved at the end of the second cycle, when the AND gate 408 becomes active by combining its output with the inverted output from OR417 (through inverter 421) in AND 422 to fire single-shot 423 to yield an output pulse on the eleventh line 70*a* to signal a failure of recognition. At the same time that single-shot 423 is fired, the diode 424 feeds a reset pulse to all of the triggers or latches 417, 404, 406, and 407 to reset them as they would be reset through action of OR411. There need be no delayed reset for the failure of recognition as the signal depends only on the firing of the single-shot 423.

With the foregoing controls, it will be seen that at the end of the first or size measuring pass, the feature test latches and logic latches will be unblocked for operation during the second cycle. If at the end of the second cycle no recognition is had, this fact is signalled and the operation stopped. If unique recognition is had, the results are read out at the end of the second cycle. If non-unique recognition is had, a third cycle is initiated and at the end thereof the status of the recognition at that point, including conflicts is read out. Thus, the receiving apparatus has the best available information qualified as best the recognition machine is able to qualify it.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for identifying an imprinted lexical symbol comprising:

(a) curve follower means for tracing the outline of said symbol and producing time variant waveforms representing the successive displacements of the follower means in tracing the symbol;

(b) means for processing said waveforms and producing first digital signals indicative of the successive directions of movement of said follower means in tracing the symbol;

(c) means for processing said waveforms and producing second digital signals indicative of the successive column and row displacement positions of said follower means relative to a synthetic matrix having a first given integral number of columns and a second given integral number of rows, wherein the height and width of the matrix is equal to the height and width of the trace of said follower means;

(d) feature test circuits including means for testing for the presence and absence of given combinations of said first digital signals and said second digital signals in given permutational orders, for predetermined time durations, and producing feature test success signals;

(e) and means for logically combining said feature test success signals in given combinations thereof to provide a recognition signal indicative of the identity of the symbol.

2. In an apparatus for identifying an imprinted lexical symbol having a finite line thickness with two line edges defining the boundary between the character line and the background, (a) means for scanning the configuration of the symbol and producing a first succession of digital signals representing the successive headings of the edges of the lines defining the symbol referenced to a given direction of movement around the symbol, and a second succession of signals, correlated in time with said first set, wherein said second set of signals represents the successive column and row displacement positions of said symbol in a synthetic matrix having a height and width respectively equal to the height and width of said symbol and having a first given number of columns and a second given number of rows;

(b) feature test means including means for combinatorially and permutationally combining said first and second signals in predetermined combinations and successions and testing the persistence thereof for given time periods to register feature test successes and failures;

(c) and means for logically combining the presence and absence of feature test registrations to produce a signal identifying the symbol.

3. In an apparatus for identifying a lexical symbol whose configuration is represented by a succession of digital signals representing the successive normalized spatial and directional data derived by tracing the outline of the line pattern defining the symbol in a closed trace path, feature test means comprising:

(a) a first stage of logical instrumentalities having at least one logical OR gate; at least one logical AND gate, and a bi-stable latch device having a set and a reset state of operation and operative responsive to the presence of predetermined combinations of said spatial and directional signals for given time durations to set the latch;

(b) a second stage of logical instrumentalities having at least one logical OR gate; at least one logical AND gate, and a bi-stable latch device having a set and a reset state of operation and operative responsive to the presence of the set condition of the latch in said first stage and to the presence of a different predetermined combination of said spatial and directional signals for given time durations to set the latch in said second stage, whereby the presence of a given shape configuration, as represented by the tested combinations and permutations of the spatial and directional signals, will be manifested by the set state of the latch in said second stage.

4. Apparatus for identifying an imprinted lexical symbol comprising:

(a) curve follower means for following the outline of the symbol and producing time variant waveforms functionally related to the configuration of the symbol;

(b) means for analyzing said waveforms and producing signals indicative of the identity of the symbol;

(c) means for producing a signal indicating confflicting identities for said symbol;

(d) means responsive to said signal indicating conflicting identities for said symbol, for causing said curve follower to penetrate a closed interior shape in said symbol and follow therein;

(e) and means responsive to the time variant waveforms produced by the following within said closed interior for altering said conflicting identity signals to resolve the conflict of identity.

5. A character recognition apparatus comprising:

(a) a curve follower device for tracing the outline of the character and producing time variant analog waveforms representing the successive instantaneous orthogonal displacements of the follower device in tracing the outline of the character;

(b) means for processing said waveforms to produce a succession of digital signals in a one out of Y code indicative of the successive headings of the curve follower device in tracing the character, wherein Y is an integer representing a predetermined number of equi-angular sectors in $2\pi$ radians;

(c) means for processing said waveforms to produce a digital column signal in a one out of N code and a row signal in a one out of M code representing the instantaneous displacement of the tracing device with respect to a synthetic matrix of N columns and M rows the dimensions of which are co-extensive with the dimensions of the character, wherein M and N are predetermined integral numbers;

(d) group testing means for testing for the presence of given groups of said heading signals and said column and row signals for predetermined time durations;

(e) sequence testing means operative responsive to said group testing means for testing for a given sequence of predetermined groups of signals;

(f) and means operative responsive to said sequence testing means for testing for predetermined combinations of given sequences to identify the character.

6. A character recognition apparatus comprising:

(a) means for producing a sequence of groups of signals representing a derived function of the configuration of the character to be identified, each group of signals including one direction signal and two displacement signals representing respectively the instantaneous heading of the unidirectional trace of the exterior outline of the character and the corresponding orthogonal displacements;

(b) group testing means including at least one logical OR gate, at least one logical AND gate, means connecting the direction signals and the displacement signals to said at least one logical OR gate and to said at least one logical AND gate in given combinations, and means responsive to the simultaneous presence of the connected signals for a predetermined time duration for producing an output response manifestive of the presence of given groups of signals for predetermined time durations;

(c) sequence testing means operative responsive to said group testing means for testing for a given sequence of predetermined groups of signals, (d) and means operative responsive to said sequence testing means for testing for predetermined combinations of given sequences to identify the character.

References Cited by the Examiner

UNITED STATES PATENTS

| | | | |
|---|---|---|---|
| 2,968,789 | 1/1961 | Weiss | 340—146.3 |
| 3,142,818 | 7/1964 | Holt | 340—146.3 |
| 3,196,397 | 7/1965 | Goldstine et al. | 340—146.3 |
| 3,213,421 | 10/1965 | Abraham | 340—146.3 |

MAYNARD R. WILBUR, *Primary Examiner.*

MALCOLM A. MORRISON, *Examiner.*

J. E. SMITH, J. S. IANDIORIO, *Assistant Examiners.*